(12) United States Patent
Namerikawa et al.

(10) Patent No.: US 6,247,371 B1
(45) Date of Patent: Jun. 19, 2001

(54) THREE-AXIS SENSOR

(75) Inventors: Masahiko Namerikawa, Kounomiya Inazawa; Yukihisa Takeuchi, Aichi; Kazuyoshi Shibata, Mizunami, all of (JP)

(73) Assignee: NGK Insulators, Ltd., Nagoyo (JP)

( * ) Notice: Subject to any disclaimer, the term of this patent is extended or adjusted under 35 U.S.C. 154(b) by 0 days.

(21) Appl. No.: 09/054,008

(22) Filed: Apr. 2, 1998

(30) Foreign Application Priority Data

Apr. 4, 1997 (JP) .................................................... 9-086355

(51) Int. Cl.$^7$ ...................................................... G01L 5/00
(52) U.S. Cl. .............................................................. 73/862
(58) Field of Search ........................... 73/862.64, 862.65, 73/862.66, 862.67, 862.04, 513.34; 310/328

(56) References Cited

U.S. PATENT DOCUMENTS

| | | | | |
|---|---|---|---|---|
| 4,525,464 | * | 6/1985 | Claussen et al. ..................... | 501/103 |
| 4,967,605 | * | 11/1990 | Okada ................................. | 73/862.04 |
| 5,081,867 | * | 1/1992 | Yamada ................................ | 73/777 |
| 5,210,455 | * | 5/1993 | Takeuchi et al. ..................... | 310/328 |
| 5,365,799 | | 11/1994 | Okada . | |
| 5,496,352 | | 3/1996 | Renger . | |
| 5,571,972 | | 11/1996 | Okada . | |

FOREIGN PATENT DOCUMENTS

| | | |
|---|---|---|
| 0 549 807 A1 | 7/1993 | (EP) . |
| 0 631 142 A1 | 12/1994 | (EP) . |
| 0 649 008 A2 | 4/1995 | (EP) . |
| 0 731 357 A1 | 9/1996 | (EP) . |
| 0 766 325 A1 | 4/1997 | (EP) . |

\* cited by examiner

Primary Examiner—Max Noori
Assistant Examiner—Jewel V. Thompson
(74) Attorney, Agent, or Firm—Burr & Brown

(57) ABSTRACT

The invention provides a small-sized and high-sensitivity three-axis sensor capable of three-dimensionally detecting a physical quantity using a single sensor unit. The three-axis sensor comprises an operating member; a supporting base having a hollow and disposed around the operating member located at the center of the hollow; and a flexible plate having a piece of piezoelectric material in contact with at least one pair of electrodes and extending across the hollow at an end of the supporting base, the operating member being suspended at the center of the hollow by the flexible plate; wherein the flexible plate is deformed in response to the behavior of the operating member corresponding to a physical quantity applied from the outside, and the piece of piezoelectric material generates a charge corresponding to the deformation of the flexible plate thereby three-dimensionally detecting the magnitude and the direction of the physical quantity. In the three-axis sensor, the flexible plate has a portion relatively weak in mechanical strength compared to the other portion, and a piezoelectric sensor element is disposed on the relatively weak portion so that the deformation of the flexible plate is concentrated in the portion where the piezoelectric sensor element is disposed.

21 Claims, 23 Drawing Sheets

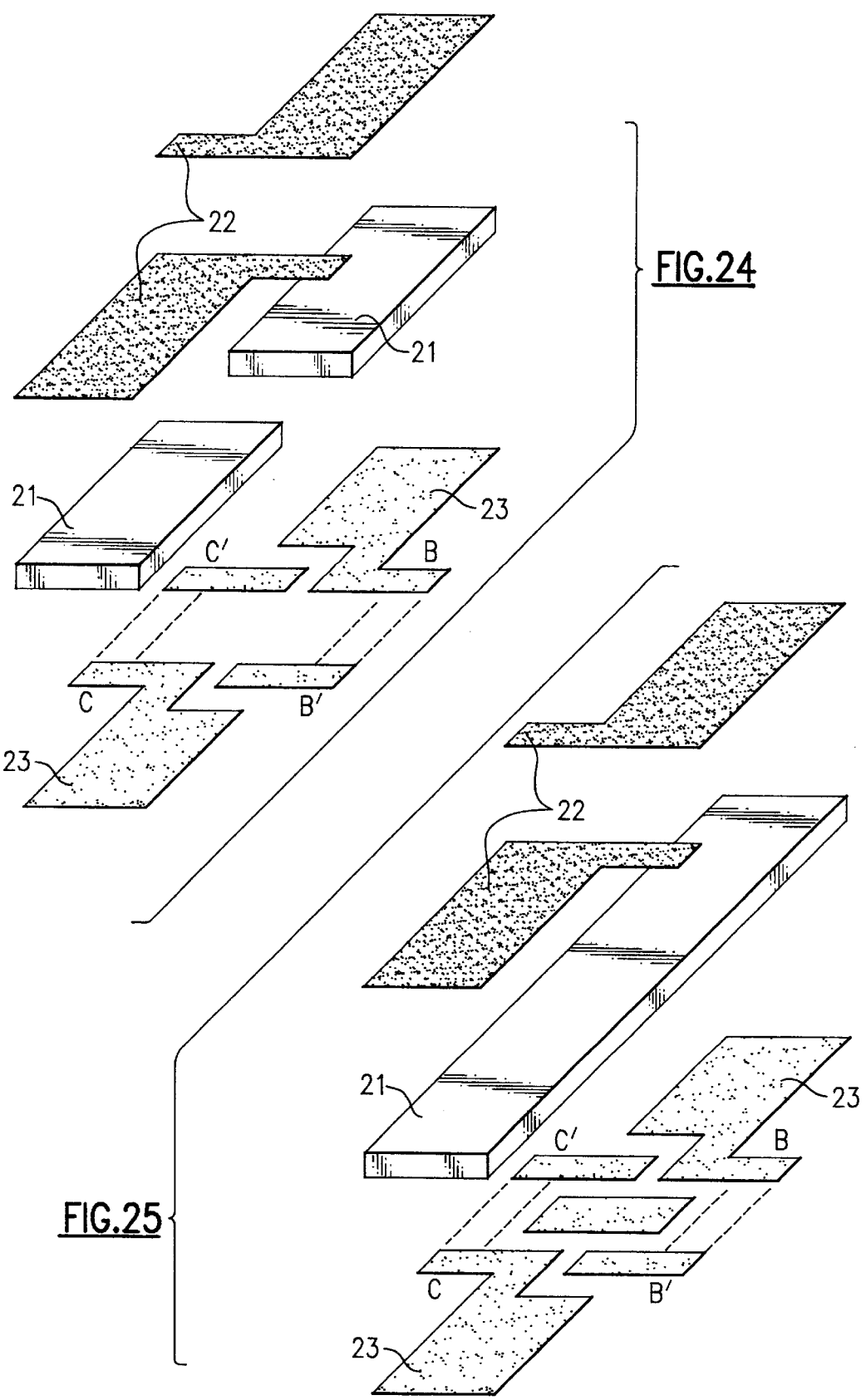

(CROSS SECTION ALONG A-A')

(CROSS SECTION ALONG B-B')

THREE-AXIS SENSOR

BACKGROUND OF THE INVENTION

1. Field of the Invention

The present invention relates to a sensor unit with a piezoelectric sensor element for three-dimensionally sensing the magnitude and the direction of a physical quantity applied from the outside.

2. Description of Related Art

In the automobile, mechanical, and related industries, there is an increasing need for a sensor capable of accurately detecting a physical quantity such as force, acceleration, magnetic field, or the like. In particular, there is a need for a small-sized sensor capable of detecting such a physical quantity for each of two- or three-dimensional components. One known technique to realize such a sensor is to dispose a plurality of piezoelectric sensor elements on a flexible plate provided with an operating member (as disclosed in Japanese Patent Application Laid-Open No. 5-26744).

In this sensor, the flexible plate is deformed in response to a physical quantity applied from the outside to the operating member, and the piezoelectric element generates a charge corresponding to the deformation of the flexible plate thereby three-dimensionally detecting the magnitude and the direction of the physical quantity using the single sensor unit. (hereinafter, this type of sensor is referred to as a "three-axis sensor").

As an example of a three-axis sensor, an acceleration sensor of the type using a weight as the operating member is described below with reference to FIG. 2. As shown in FIG. 2, when an acceleration of a is applied from the outside on the sensor, a weight 1 experiences an inertial force f in a direction opposite to the acceleration a. As a result, a flexible plate 3, which extends in a horizontal direction between the weight 1 and a supporting base 2, has a deformation corresponding to the inertial force f.

Depending on the direction and the amount of the deformation 4, a corresponding amount of charges are generated in respective piezoelectric elements 5 disposed on the flexible plate 3. By detecting these charges, it is possible to perform a three-dimensional detection of the acceleration applied from the outside.

This type of sensor is described in further detail below with reference to FIGS. 3(a) and 3(b). In the sensor shown in FIGS. 3(a) and 3(b), the center of the bottom plane of a cylindrical weight 10 to which a flexible plate 12 is attached is defined as the origin O, the plane extending in parallel to the flexible plate 12 passing through the origin O is defined as an X-Y plane, and X and Y axes are defined in this X-Y plane so that X and Y axes are perpendicular to each other. Furthermore, a Z axis is defined so that it extends in a direction perpendicular to the X-Y plane and passes through the origin O.

In this structure, each portion of the piezoelectric material located between one pair of upper and lower electrodes is referred to as a "piezoelectric sensor element". In the specific example of the sensor shown in FIGS. 3(a) and 3(b), four piezoelectric sensor elements each consisting of a particular portion of the piezoelectric material and a pair of electrodes are disposed in the X and Y directions on the flexible plate 12, and additional eight piezoelectric sensor elements for use in detection in the Z direction are disposed.

In this sensor, the respective components of the inertial force f applied on the weight 1 by the external acceleration a are determined by the amounts of charge generated in the respective piezoelectric sensor elements as described below. That is, the X-axis component $f_x$ of the inertial force is detected by the piezoelectric sensor elements $E_1$–$E_4$ as shown in FIG. 4(a). Similarly, the Y-axis component $f_y$ of the inertial force is detected by the piezoelectric sensor elements $E_5$–$E_8$ (not shown). On the other hand, the Z-axis component $f_z$, shown in FIG. 4(b), of the inertial force is detected by the piezoelectric sensor elements $E_9$–$E_{12}$ and also by the piezoelectric sensor elements $E_{13}$–$E_{16}$.

The directions of the respective components are determined on the basis of the charge polarity pattern. For example, in the example shown in FIG. 4(a), a charge polarity pattern of "+–+–" appears on the upper surface of the piezoelectric material and a charge polarity pattern of "+––+" appears on the upper surface of the piezoelectric material in FIG. 4(b), wherein the pattern is seen from left to right in both cases.

From the resultant force of the combination of the detected components $f_x$, $f_y$, and $f_z$, the direction and the magnitude of the inertial force f and thus those of the external acceleration a can be determined in a three dimensional fashion using the single small-sized sensor.

In such a sensor, the flexible plate is required to have high flexibility so as to obtain sufficient sensitivity. On the other hand, the weight and the supporting base are required to have high rigidity and low flexibility.

Though it is possible to satisfy the aforementioned antipodal properties by assembling independently made members such as a weight, a supporting base, and a flexible plate into a sensor, many parts and manufacturing processes are required, thereby deteriorating productivity.

There is considered unitary formation of a sensor by the use of one material as a means for improving productivity by reducing the numbers of parts and manufacturing processes. As embodiments of unitary formation by the use of a ceramic material, there may be employed a method for cutting a ceramic green body formed by a one-axis press or the like with filling a ceramic powder into a mold as shown in FIG. 34, a method for filling a ceramic powder into a mold having a shape of mutual compensation with a sensor and then subjecting the ceramic powder to a one-axis press as shown in FIG. 35, a method for injection-molding a ceramic slurry as shown in FIG. 36, a method for molding by a slip casting, or the like.

However, since a unitary molded body has a low strength of a flexible portion and a wide variance in density in any of the aforementioned methods, it is difficult to make a flexible plate thin and to precisely control a thickness of the flexible plate. That is, a flexible plate has low flexibility and flexibility is varied depending on a flexible plate or a portion of a flexible plate in a sensor produced by an aforementioned method.

Therefore, in addition to a low sensitivity of a sensor, the sensitivity sometimes varies among sensors even if the same acceleration is applied. Further, in the case that sensitivity varies depending on an axis, the direction and the magnitude of the magnitude of the acceleration obtained from a resultant force become inaccurate, thereby deteriorating a sensor precision.

Further, in the sensor of the above-described type, if piezoelectric materials 5 are disposed in particular limited areas on the flexible plate 3 as shown in FIG. 5, then the thickness of those portions where no piezoelectric materials 5 are disposed becomes relatively thin, and thus these portions come to have a tendency to be deformed more easily. In contrast, the portions where the piezoelectric materials 5 are disposed are not deformed so easily. This results in a reduction in the sensitivity of the sensor.

Although it is possible to increase the sensitivity of the sensor by increasing the size of the weight so as to make the flexible plate deformable to a greater extent, this technique is unsuitable because such increasing in the size of the weight will result in an undesirable increase in the total size of the sensor, and thus it will become impossible to realize a sensor with a desired small size.

SUMMARY OF THE INVENTION

In view of the above, it is an object of the present invention to provide a small-sized sensor having an improved sensitivity while maintaining the advantage of the sensor of the above-described type that three-dimensional detection of a physical quantity can be performed with a single sensor.

According to an aspect of the present invention, there is provided a three-axis sensor comprising:
an operating member;
a supporting base having a hollow and disposed around said operating member located at the center of the hollow;
a flexible plate having a piece of piezoelectric material in contact with at least one pair of electrodes and extending across said hollow at an end of said supporting base, said operating member being suspended at the center of said hollow by said flexible plate;
said flexible plate being deformed in response to the behavior of said operating member corresponding to a physical quantity applied from the outside, said piece of piezoelectric material generating a charge corresponding to the deformation of the flexible plate thereby three-dimensionally detecting the magnitude and the direction of said physical quantity.

According to another aspect of the invention, there is provided a three-axis sensor comprising:
a supporting column;
a flexible plate having a piece of piezoelectric material in contact with at least one pair of electrodes and extending outward in a horizontal direction from said supporting column located at the center; and
an operating member suspended at the end of said flexible plate;
said flexible plate being deformed in response to the behavior of said operating member corresponding to a physical quantity applied from the outside, said piece of piezoelectric material generating a charge corresponding to the deformation of the flexible plate thereby three-dimensionally detecting the magnitude and the direction of said physical quantity.

In the sensor according to the invention, a weight is preferably employed as the operating member for detecting an acceleration applied from the outside.

The supporting base or the supporting column, operating member, flexible plate, and thick portion may all be produced in an integral fashion by means of baking using a green sheet lamination technique.

The supporting base or the supporting column, the operating member, and the flexible plate are preferably produced in an integral fashion, and at least one of the supporting base or the supporting column, the operating member, and the flexible plate has a different chemical composition.

It is preferable that only the flexible plate is made of ceramic containing 0.1–0.6 wt % of titanium in terms of $TiO_2$ and/or 0.005–0.1 wt % of magnesium in terms of MgO, and it is more preferable that only the flexible plate is made of ceramic containing 0.2–0.5 wt % of titanium in terms of $TiO_2$ and/or 0.01–0.05 wt % of magnesium in terms of MgO.

It is also preferable that the flexible plate has a portion relatively weak in mechanical strength compared to the other portion, and a piezoelectric sensor element is disposed on said relatively weak portion so that the deformation of said flexible plate is concentrated in the portion where said piezoelectric sensor element is disposed.

The flexible plate is preferably made partially thick compared to the other portion thereby forming the portion relatively weak in mechanical strength.

It is preferable that the supporting base, operating member, flexible plate, and thick portion are all produced in an integral fashion by means of baking using a green sheet lamination technique, in such a manner that said flexible plate becomes partially thick compared to the other portion.

Alternatively, the flexible plate is preferably made partially thick by means of a screen printing technique, attachment of a reinforcing member, or a transfer printing technique.

It is also preferable that the flexible plate is made partially hard compared to the other portion thereby forming the portion relatively weak in mechanical strength. A hardening agent is preferably disposed by means of a coating or spraying technique so that the flexible plate itself or the piezoelectric material formed over a partial or the entire upper surface of the flexible plate is made partially hard compared to the other portion.

BRIEF DESCRIPTION OF THE DRAWINGS

FIG. 24 is a perspective view illustrating an example of the layout of electrodes and piezoelectric materials in a three-axis sensor according to the invention.

FIG. 25 is a perspective view illustrating an example of the layout of electrodes and piezoelectric materials in a three-axis sensor according to the invention.

DESCRIPTION OF THE PREFERRED EMBODIMENTS

Figure 1A:
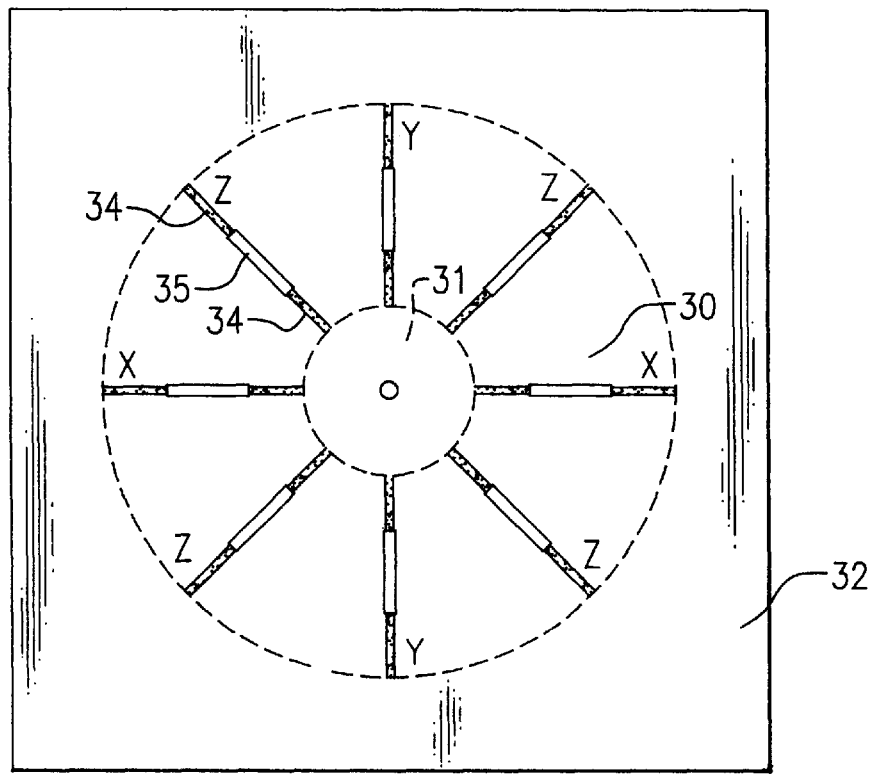
FIGS. 1(a) and 1(b) are a top view and a cross-sectional view, respectively, of an embodiment of a three-axis sensor according to the present invention.

In one embodiment of the present invention, a sensor comprises, as shown in FIGS. 3(a), 3(b), 6(a) and 6(b), an operating member 10; a supporting base 11 having a hollow and disposed around the operating member 10 located at the center of the hollow; one or more flexible plates 12 each having a piece of piezoelectric material in contact with at least one pair of electrodes and extending across the hollow at an end of the supporting base 11, the operating member 10 being suspended at the center of the hollow by the flexible plates 12; (hereinafter this basic type of sensor is referred to as a "standard" type sensor"). Alternatively, the sensor may comprise, as shown in FIGS. 7(a) and 7(b), a supporting column 13; one or more flexible plates 14 having a piezoelectric material in contact with a pair of electrodes and extending in a horizontal direction from the supporting column 13 located at the central position; and operating members 15 suspended at the end of the respective flexible plates 14 (hereinafter this basic type of sensor is referred to as an umbrella-shaped sensor).

Figure 7A:
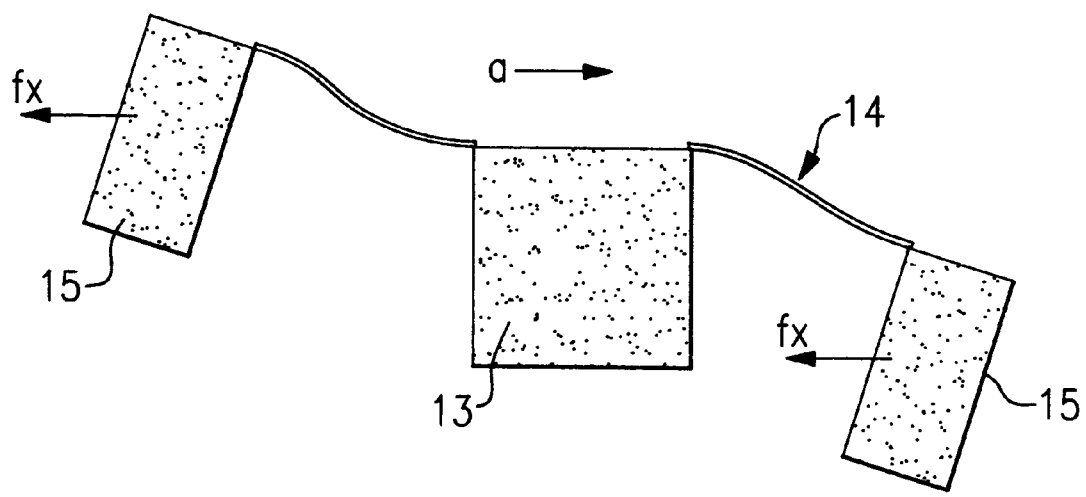
FIGS. 7(a) and 7(b) are a schematic diagram conceptually illustrating the operation of a three-axis sensor according to the invention.
Figure 7B:
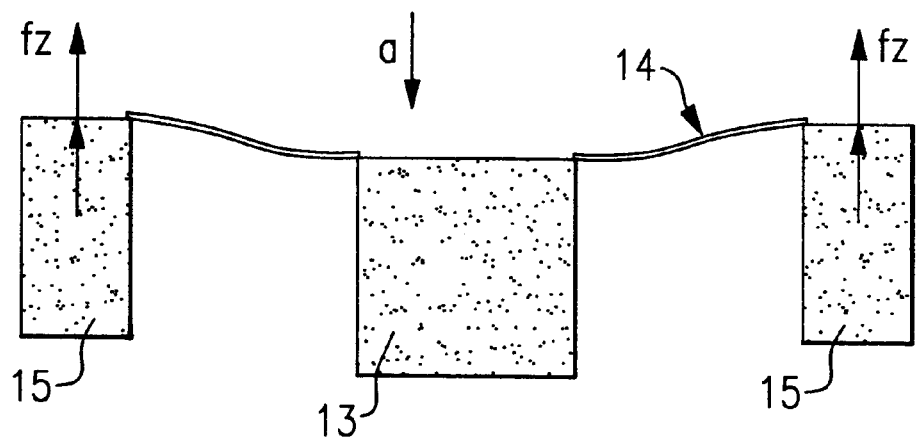

In the umbrella-shaped sensor, the weight 15 serving as the operating member behaves in such a manner as shown in FIG. 7(a) in response to acceleration $a_x$ or $a_y$ in the X-Y plane, while it behaves in such a manner as shown in FIG. 7(b) in response to acceleration $a_z$ in a direction along the Z axis, and thus the magnitude and the direction of the acceleration a applied from the outside can be detected as in the standard type.

In the umbrella-shaped sensor, it is generally easier to employ a weight having a greater volume and thus having a greater mass than in the standard type. Therefore, in the umbrella-shaped sensor, the flexible plate can be deformed to a greater degree, which results in a higher sensitivity.

In the present invention, the supporting base 11 disposed around the operating member 10 is a member responsible for supporting the flexible plate 12 and the operating member 10, and there are no special limitations in its shape and material as long as it has a mechanical strength high enough to support the flexible plate 12 and the operating member 10.

Figure 3A:
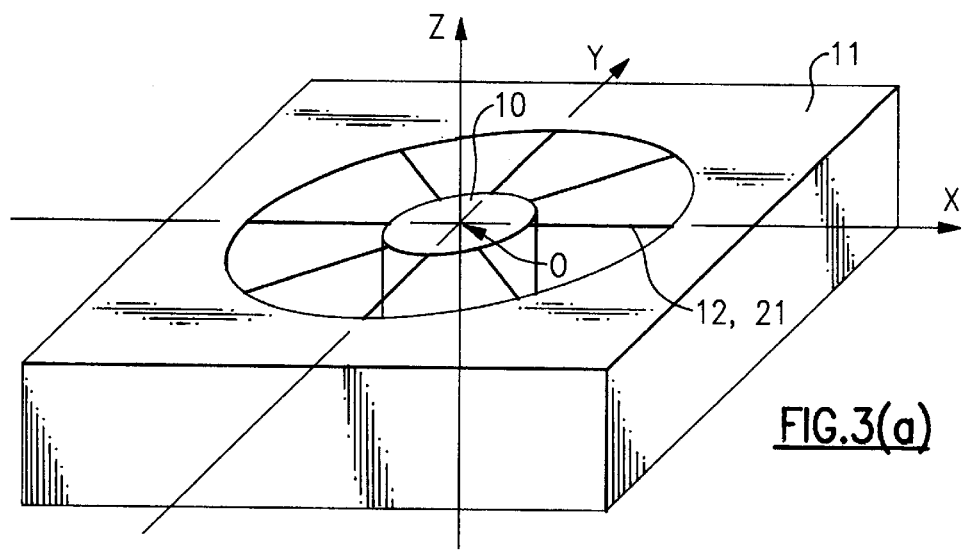
FIGS. 3 (a) and 3(b) are a perspective view and a top view, respectively, of an embodiment of a three-axis sensor according to the invention.
Figure 3B:
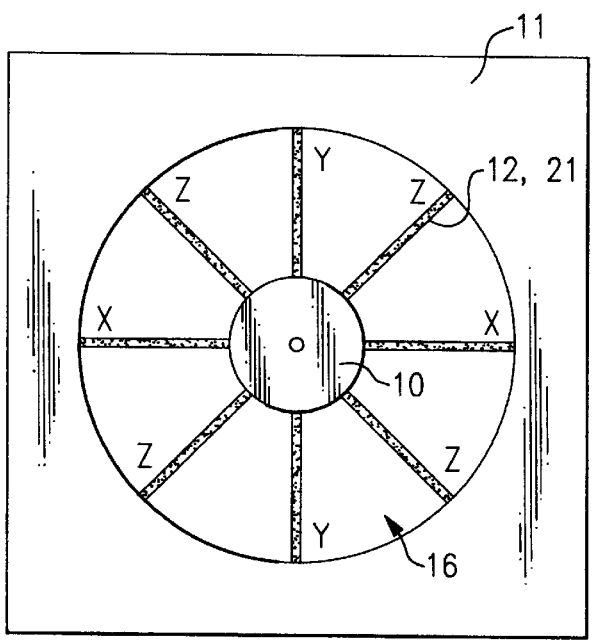
Figure 8:
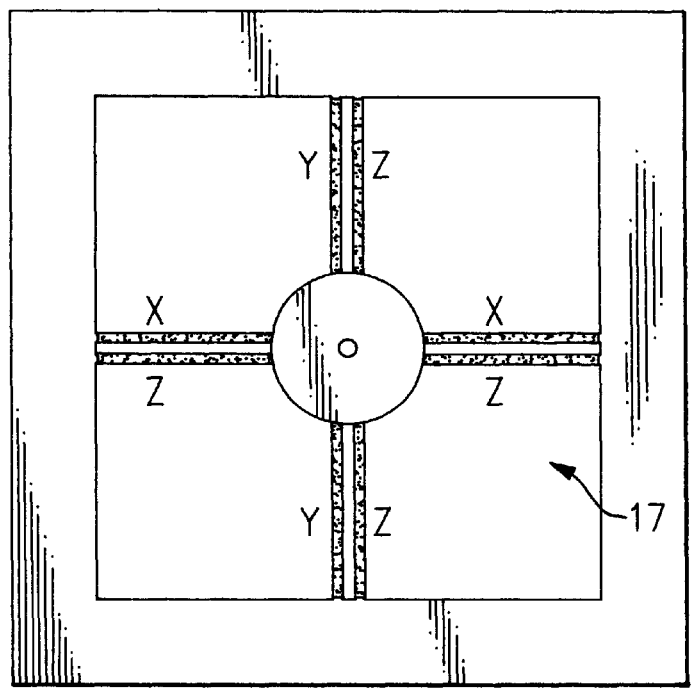
FIG. 8 is a top view illustrating the operation of an embodiment of a three-axis sensor according to the invention.
Figure 9:
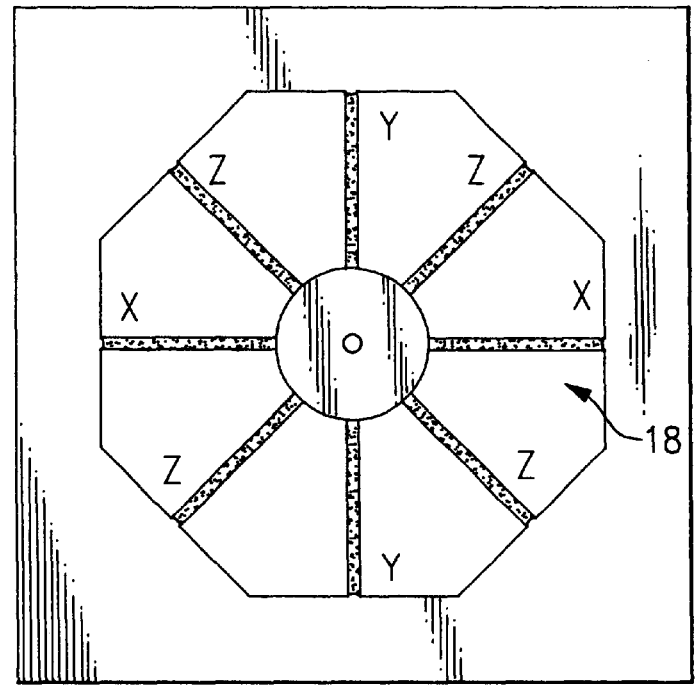
FIG. 9 is a top view illustrating the operation of an embodiment of a three-axis sensor according to the invention.
Figure 10:
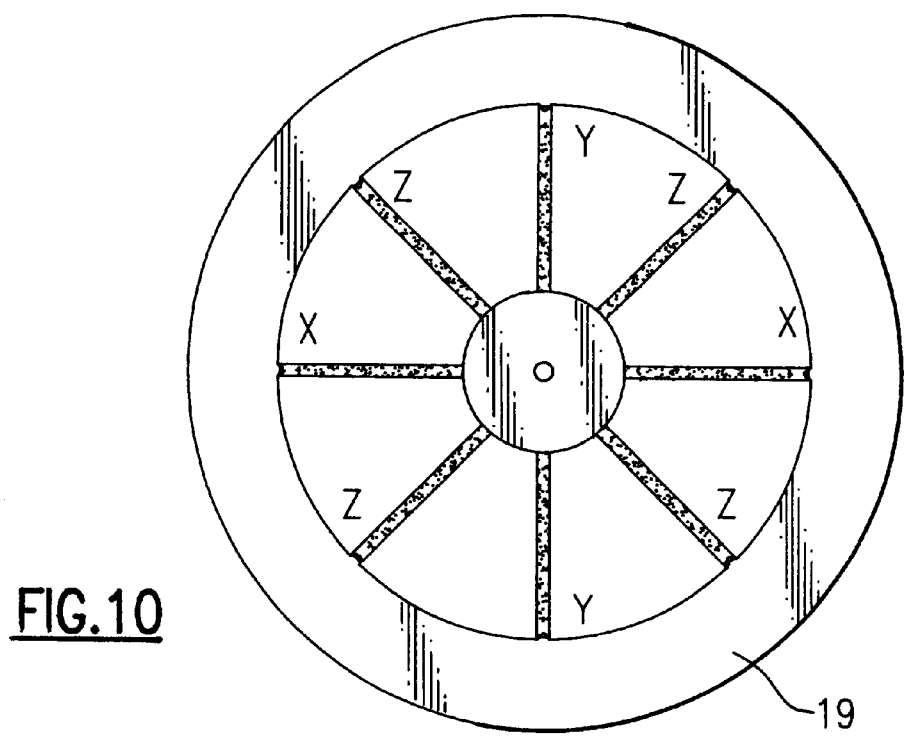
FIG. 10 is a top view illustrating the operation of an embodiment of a three-axis sensor according to the invention.

The shape of the supporting base 11 is defined by its outer shape and also by the inner shape of the hollow. For example, when the supporting base 11 is square in outer shape, the hollow may be formed into a cylindrical shape 16 as shown in FIG. 3(b), or into a square shape 17 as shown in FIG. 8, or otherwise into an octagonal shape 18 as shown in FIG. 9. The outer shape may also be cylindrical as shown in FIG. 10.

In general, the acceleration is applied in a rather symmetrical fashion in the X-Y plane. If this fact is taken into consideration, it is more desirable that the supporting base 11 be cylindrical in both the outer and inner shapes as shown in FIG. 10.

In the case of the umbrella-shaped type, the supporting column 13 plays a similar role to that of the supporting base 11, and it may be formed into a cylindrical, polygonal, or other proper shape. The supporting column 13 may also be made of a similar material to that employed for the supporting base 11.

It is preferable that the material of the supporting base 11 be rigid to a proper degree so that the supporting base 11 is not deformed to a great degree when an external acceleration is applied thereby ensuring that the sensor can accurately detect the behavior of an object (such as a car) on which the sensor is installed. This also allows the sensor to have a higher sensitivity.

Conversely, a material which will absorb the behavior of the object to be sensed will result in reductions in the sensitivity and the reliability, and thus such a material is unsuitable. For example, metal and ceramic having a high rigidity are preferable materials. Of these two materials, ceramic is more preferable in that it is not easily influenced by electromagnetic waves.

Figure 11:
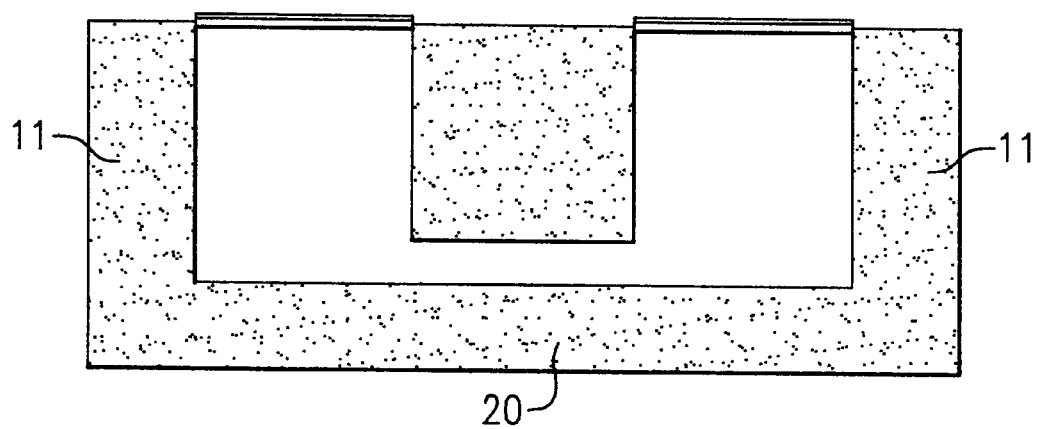
FIG. 11 is a cross-sectional view of an embodiment of a three-axis sensor according to the invention.

To increase the rigidity of the supporting base, it is desirable that the hollow of the supporting base 11 be closed at its one end as shown in FIG. 11. In the case where the supporting base 11 has a bottom plate 20, the structure has an additional advantage that the sensor can be easily mounted on an object to be detected.

In the present invention, the operating member 10 may be made of a rod-shaped material if the physical quantity applied on the operating member 10 is a mechanical force, a magnetic material for a magnetic force, or a weight for an acceleration. The sensor of the invention may be used in a most preferable fashion as an acceleration sensor, and thus it is assumed hereinafter that the operating member 10 is formed into a weight shape.

The weight 10 is a member suspended by the flexible plate 12 in such a manner that the flexible plate 12 is deformed by the force exerted on the weight 10 by a magnitude and into a direction corresponding to an external acceleration applied on the weight 10. The weight 10 has no special laminations in shape and material as long as the above purpose is achieved. The weight 10 may be bonded to the flexible plate 12 via an adhesive or the like or may be formed into a single structure integral with the flexible plate 12.

Figure 12:
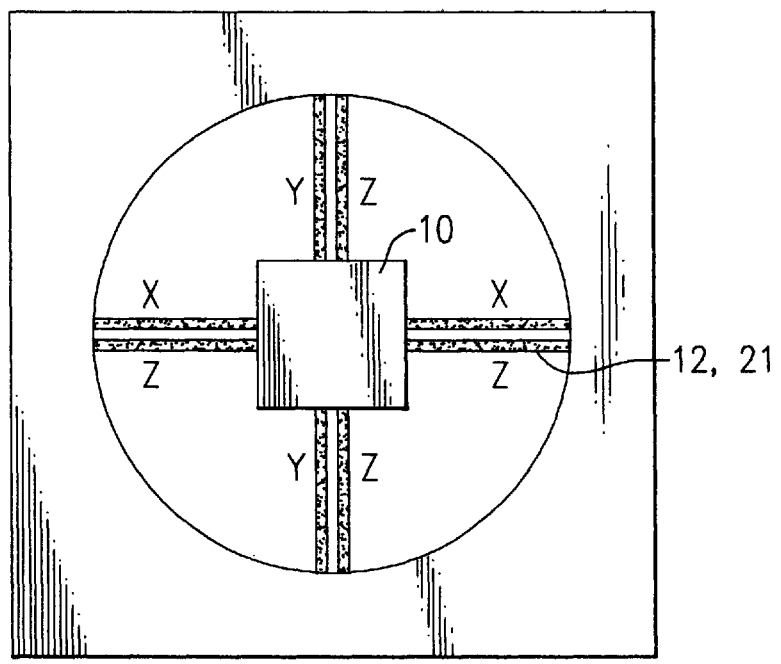
FIG. 12 is a top view illustrating the operation of an embodiment of a three-axis sensor according to the invention.
Figure 13:
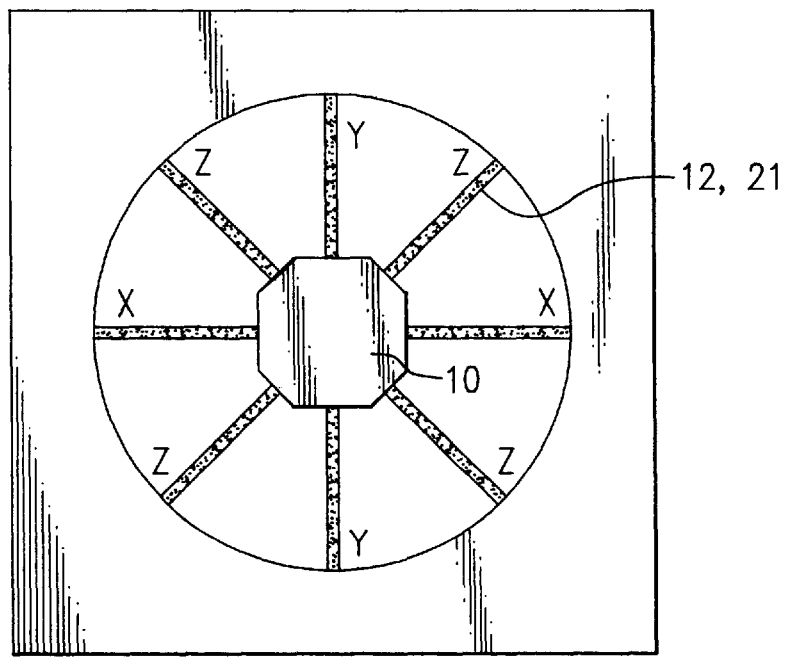
FIG. 13 is a top view illustrating the operation of an embodiment of a three-axis sensor according to the invention.

More specifically, the weight may be formed into a cylindrical shape as shown in FIG. 3(b), a rectangular shape as shown in FIG. 12, or an octagonal shape as shown in FIG. 13. The cylindrical shape such as that shown in FIG. 3(b) is preferable in that this structure is symmetric to a high degree in terms of the detection of the acceleration in the X-Y plane. More preferably, the weight may be formed into a truncated cone shape whose external diameter increases with the distance measured from the flexible plate 12 toward the bottom of the supporting base 11, or into a stepped-diameter cylindrical shape in which the diameter of the lower portion is greater than that of the upper portion. These structures have the advantage that the center of gravity is far from the flexible plate 12.

In the case of the umbrella-shaped basic type, the weight may be formed for example into a shape being rectangular in the outer sides and having a cylindrical hollow similar to the shape of the supporting base 11 employed in the standard type sensor shown in FIG. 3(b).

It is preferable that the weight 10 be made of a material having a sufficiently large mass and having a high density so that the weight 10 can generate a great force in response to an acceleration applied from the outside thereby deforming the flexible plate 12 to a great degree, which results in a high sensitivity.

For example, metal and ceramic are preferable materials for this purpose. Of these two materials, ceramic is more preferable in that it is not easily influenced by electromagnetic waves and it is lower in the thermal expansion coefficient.

In the present invention, the flexible plate 12 is a plate-shaped member with a piezoelectric material, disposed across the hollow at an end of the supporting base 11 and suspending a weight 10 at the center of the hollow or otherwise extending outward from the supporting column 13 located at the center and having a weight 15 at the end of the flexible plate. In response to the magnitude and direction of an external acceleration, the weight 10 or 15 generates a force thereby deforming the flexible plate 12 or 14 to a corresponding degree, which in turn generates a corresponding charge in the piezoelectric material. Thus it is possible to make a three-dimensional detection of the physical quantity on the basis of the amount of the generated charge and the charge polarity pattern.

Although the flexible plate 12 or 14 has no special limitations in the shape and material as long as it has a sufficient flexibility and a mechanical strength high enough not to be broken by the behavior of the weight 10 or 15, it is preferable that an elastic deformation easily occurs in the flexible plate 12 or 14 so that the sensor has a high sensitivity.

More specifically, metal, ceramic, glass, and resin may be employed as the material for the flexible plate 12 or 14. Of these materials, ceramic is most preferable because it is high in the elastic modulus and thus it can generate a high stress in the piezoelectric material. When the flexible plate is made of a conductive material such as metal, it is required to make isolation between the flexible plate and the electrodes located on the piezoelectric material.

Figure 14:
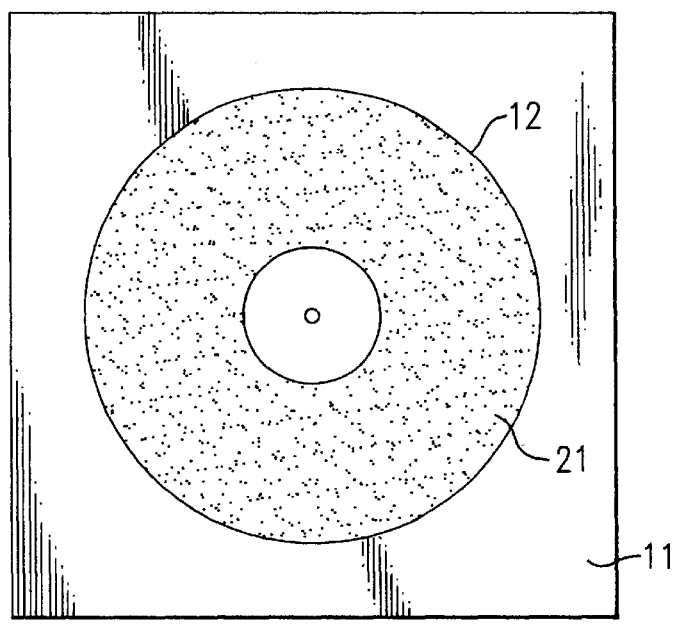
FIG. 14 is a top view illustrating the operation of an embodiment of a three-axis sensor according to the invention.

Alternatively, the entire flexible plate 12 may be made up of a piezoelectric material 21 as shown in FIG. 14.

The flexible plate preferably has a porosity of 10% or less, and more preferably 5% or less. When the porosity is too high, the flexible plate is prone to expand and contract in a longitudinal direction, and horizontal strain is hardly applied to the piezoelectric material, thereby deteriorating sensitivity of the sensor.

Incidentally, the porosity was calculated by the use of a definition of the porosity as (area of pore/visible area)×100 (%) in the case that a cross section was subjected to mirror-plane finishing lest particles should drop off during mirror-plane polishing and observed by the use of a microscope such as SEM.

Figure 6A:
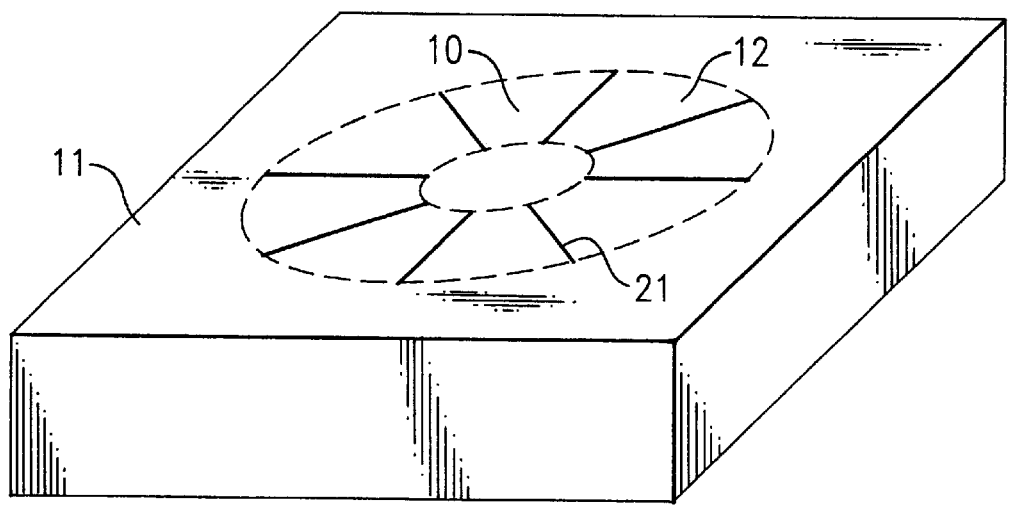
FIGS. 6(a) and 6(b) are a perspective view and a top view, respectively, of an embodiment of a three-axis sensor according to the invention.
Figure 6B:
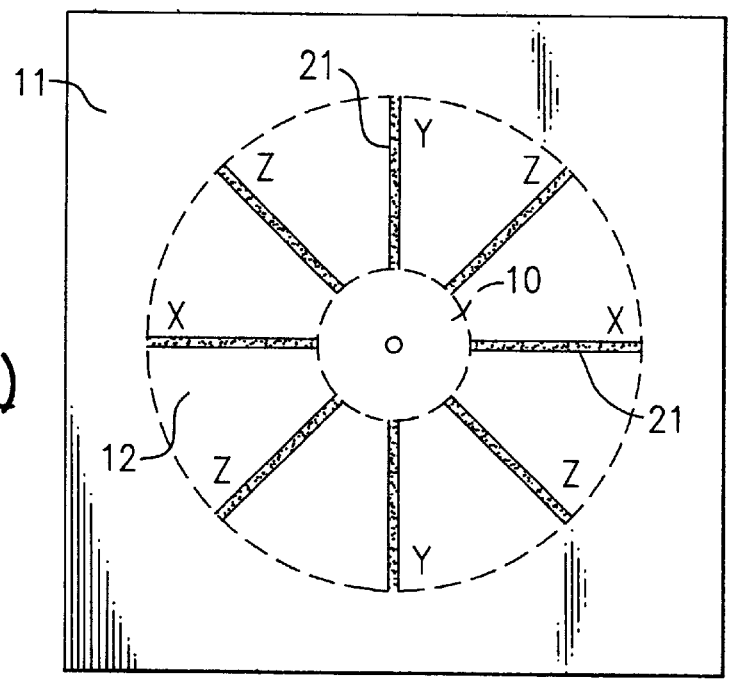

As for the shape, the flexible plate may be formed either of a single plate as shown in FIG. 6(b) or of a plurality of long plates extending in radial directions between the weight 10 and the supporting base 11 as shown in FIG. 3(b) or between the supporting column 13 and the weight 15.

However, the structure comprising a plurality of long plates shown in FIG. 3(b) is more preferable because this structure allows easier deformation of the flexible plate 12 or 14.

In the case where a plurality of long plates are employed, they are needed to be disposed so that they extend in radial directions from the center of the upper surface of the weight 10 and so that they are symmetric in terms of the detection of the acceleration in the X-Y plane. The number of long plates, the width thereof, the manner in which they extend may be properly determined depending on the number of piezoelectric sensor elements 21, the manner in which they are disposed, and the shape of the supporting base 11.

For example, as shown in FIG. 3(b), eight long plates may be disposed so that they extend in radial directions from the center of the upper surface of the weight 10. In the case where charges are detected in directions along axes X, Y, and Z independently of each other, at least two long plates for each axis and thus six long plates in total are enough for the detection. If long plates disposed in the X and Y directions are also used for detection in the Z direction, the total number of long plates may be reduced to four as shown in FIG. 15.

Figure 16:
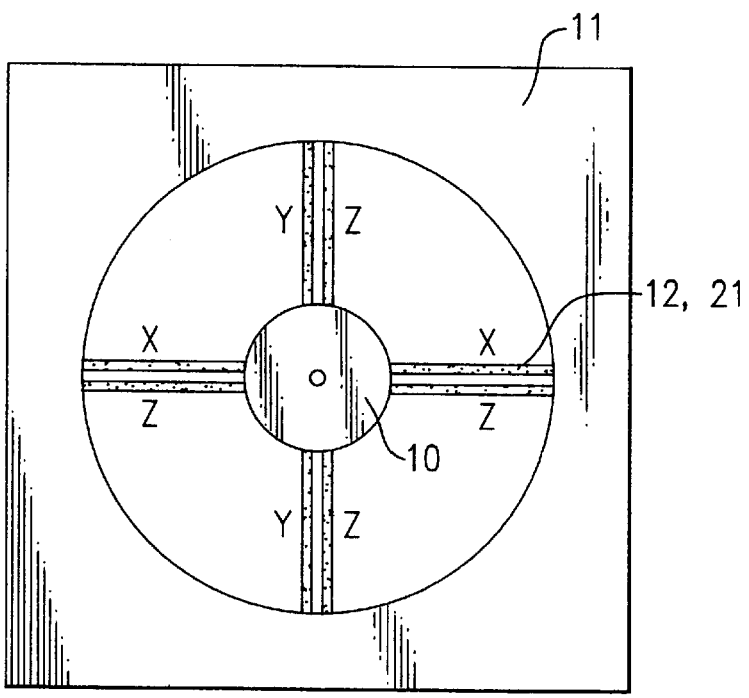
FIG. 16 is a top view illustrating the operation of an embodiment of a three-axis sensor according to the invention.

Alternatively, a plurality of long plates may be disposed in parallel in each direction as shown in FIG. 16.

Figure 15:
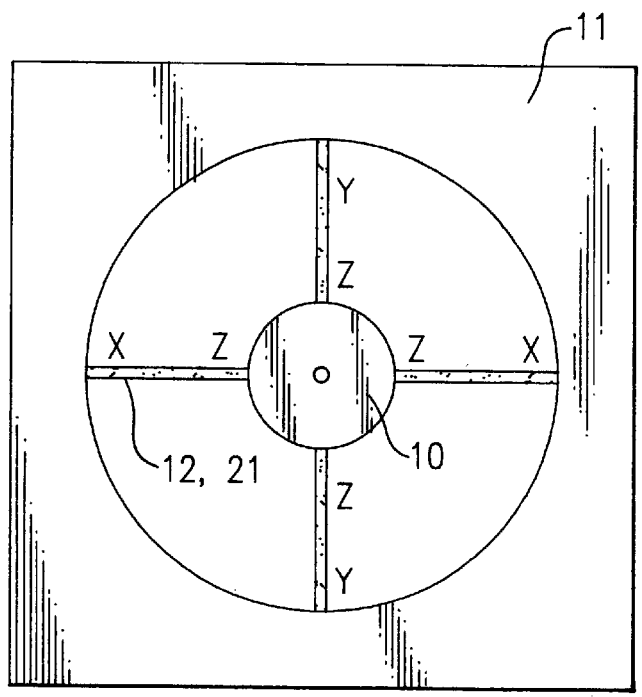
FIG. 15 is a top view illustrating the operation of an embodiment of a three-axis sensor according to the invention.

However, the structure shown in FIG. 15 in which there are four long plates is more preferable because of its simple interconnection and easy process required for adjustment.

A piezoelectric material is disposed on the flexible plate in such a manner that the piezoelectric material is in contact with at least one pair of electrodes. When an acceleration is applied from the outside on the weight, the weight generates a force which deforms the flexible plate. The piezoelectric material generates a charge corresponding to the deformation of the flexible plate thereby detecting the magnitude and the direction of the acceleration.

Preferable piezoelectric materials which can be employed in the present invention include piezoelectric ceramic such as PZT, PMN and PNN and organic piezoelectric materials. Of these, PZT is more preferable because it has good piezoelectric characteristics.

The piezoelectric material preferably has a porosity of 50% or less, and more preferably 20% or less. This is because it is difficult to obtain sufficient piezoelectric/electro-stricture properties when the porosity is too high.

Incidentally, the porosity was calculated in the same manner as the aforementioned porosity of the flexible plate.

The circular flexible plate or long plate-shaped flexible plates may themselves be formed of a piezoelectric material. Instead, a piezoelectric material may be disposed across the entire upper surface of the single circular flexible plate 12 disposed on the upper surface of the supporting base 11 as in the case of FIG. 14, or a piezoelectric material may be disposed on the entire upper surface of each of the plurality of long plate-shaped flexible plates 12 extending in radial directions as shown in FIGS. 3(a) and 3(b). In the structure shown in FIGS. 6(a) and 6(b), plural pieces of piezoelectric materials are disposed on the circular flexible plate 12 such that they extend in radial directions from the origin O at the center of the weight 10.

If a pair of electrodes are disposed at an arbitrary location so that the upper and lower surfaces of the piezoelectric materials are in contact with the respective electrodes, then that portion becomes a "piezoelectric device element".

In the case where piezoelectric materials are disposed in radial directions, if charges are detected in the directions along the axes X, Y, and Z independently of each other, then at least two piezoelectric elements for each axis and thus six piezoelectric elements in total are enough for the detection. If the piezoelectric elements in the X and Y directions are also used for detection in the Z direction, the number of piezoelectric elements may be reduced to four as in the case of the structure shown in FIG. 15.

Furthermore, a plurality of piezoelectric elements may also be disposed in parallel in each direction as in the case of FIG. 16.

Figure 17:
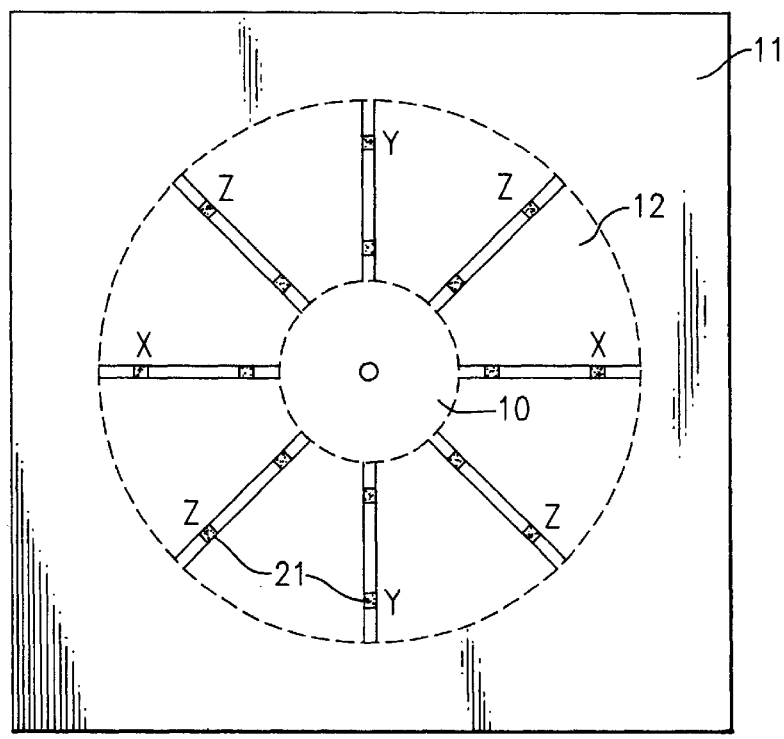
FIG. 17 is a top view illustrating the operation of an embodiment of a three-axis sensor according to the invention.
Figure 18:
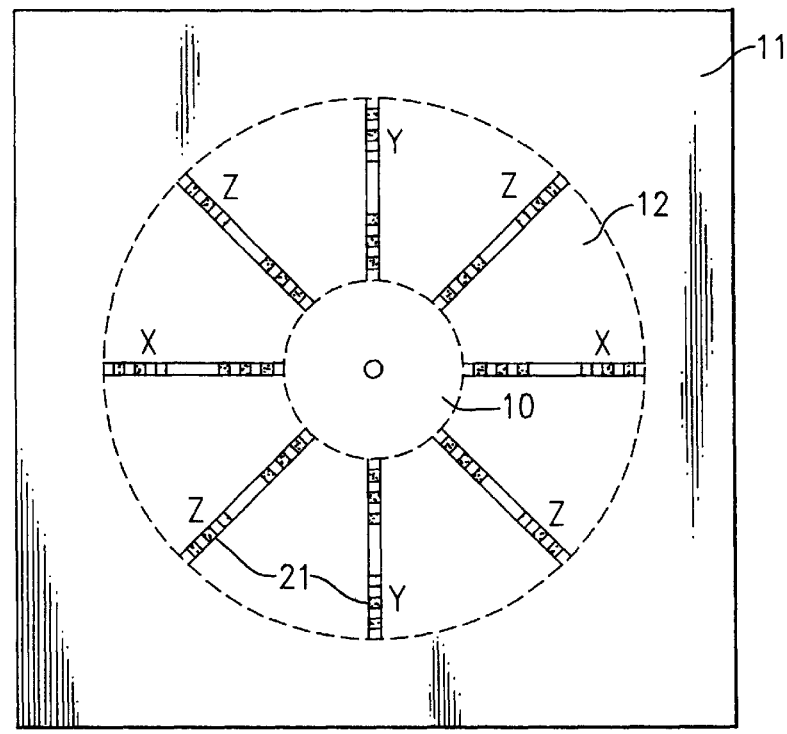
FIG. 18 is a top view illustrating the operation of an embodiment of a three-axis sensor according to the invention.

It is not necessarily required that each piezoelectric element consists of a single piece of piezoelectric material disposed in a continuous fashion. The piezoelectric sensor elements may also be realized with a plurality of pieces of smaller-sized piezoelectric materials 21 so that each piece of piezoelectric material forms one piezoelectric sensor element as shown in FIGS. 17 or 18.

Figure 19:
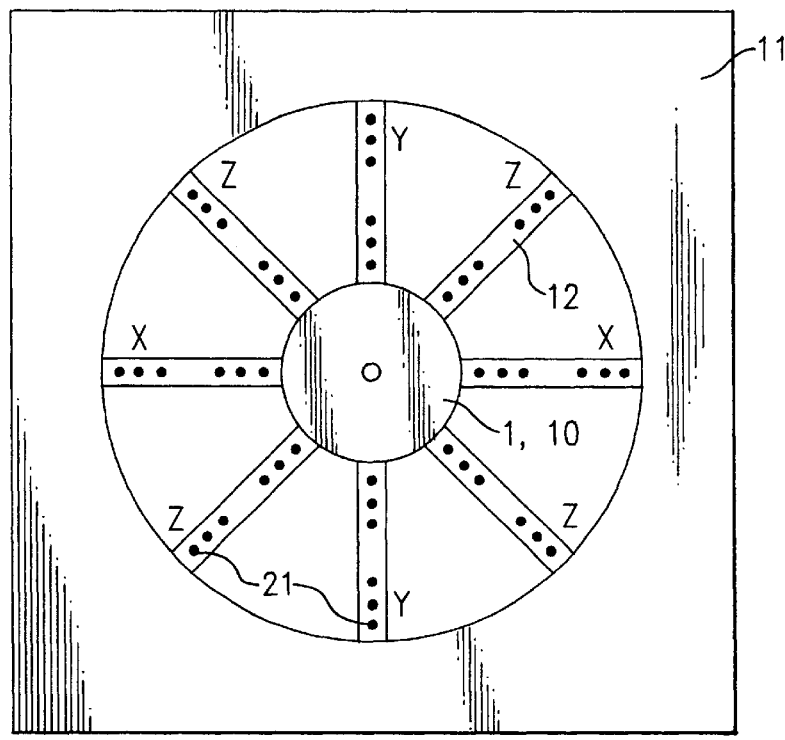
FIG. 19 is a top view illustrating the operation of an embodiment of a three-axis sensor according to the invention.
Figure 20:
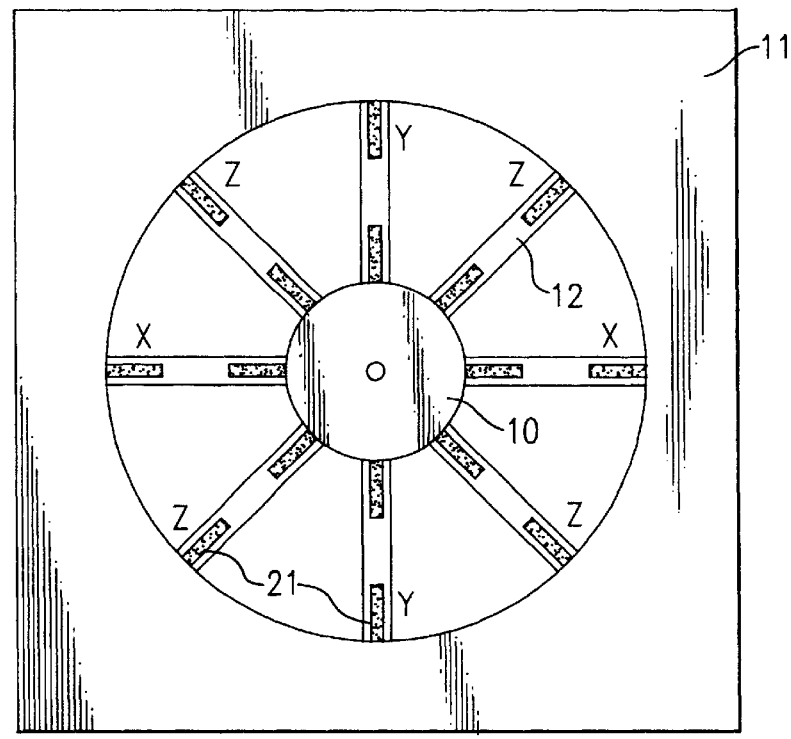
FIG. 20 is a top view illustrating the operation of an embodiment of a three-axis sensor according to the invention.

In this case, the respective pieces of electric materials 21 may be formed into any desired shape. For example, they may be formed into a rectangular shape as shown in FIGS. 17 or 18, or into a circular shape as shown in FIG. 19. Otherwise, the respective pieces of piezoelectric materials 21 may be formed into a strip shape as shown in FIG. 20.

Figure 23:
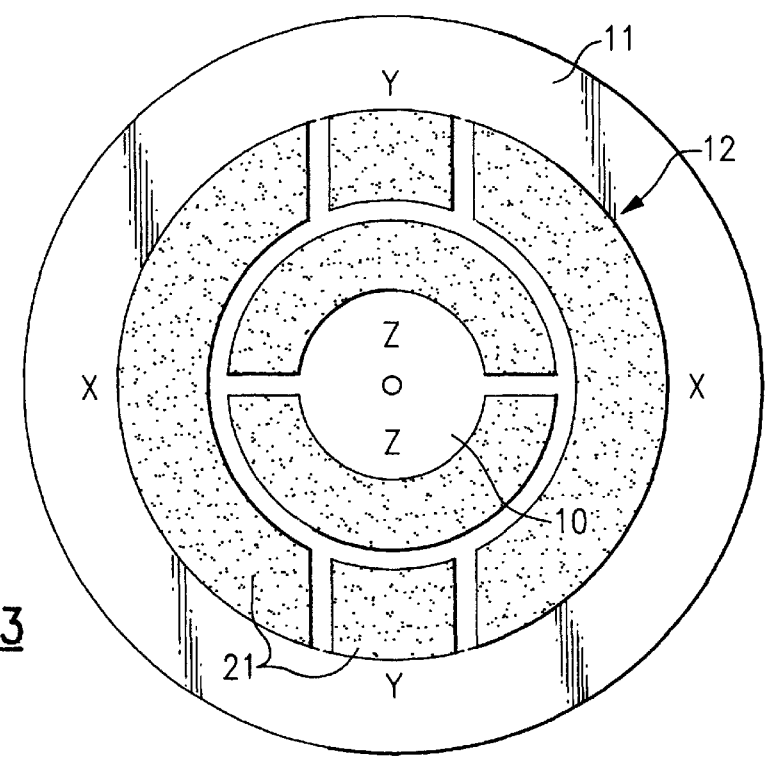
FIG. 23 is a top view illustrating the operation of an embodiment of a three-axis sensor according to the invention.
Figure 21:
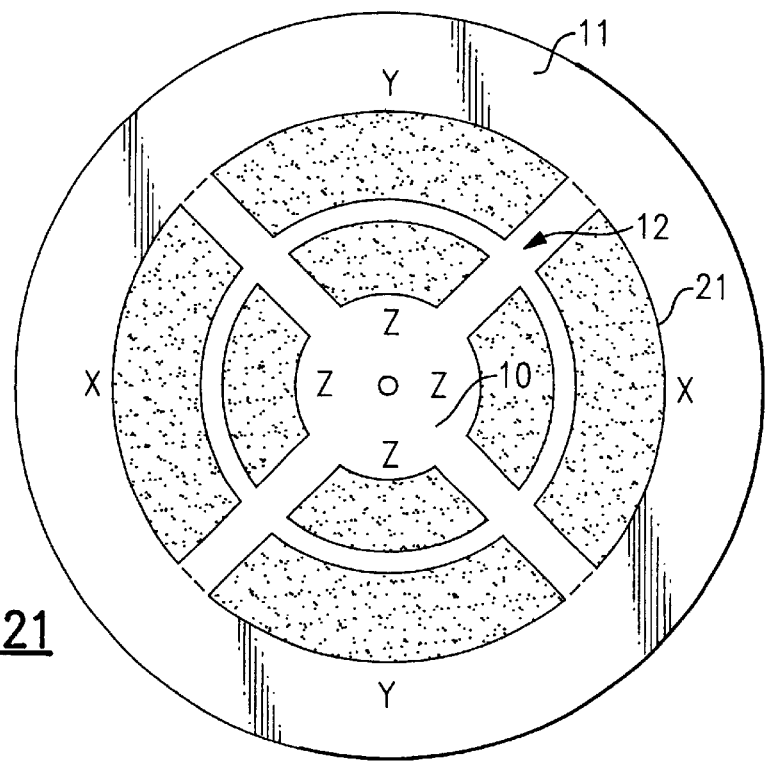
FIG. 21 is a top view illustrating the operation of an embodiment of a three-axis sensor according to the invention.
Figure 22:
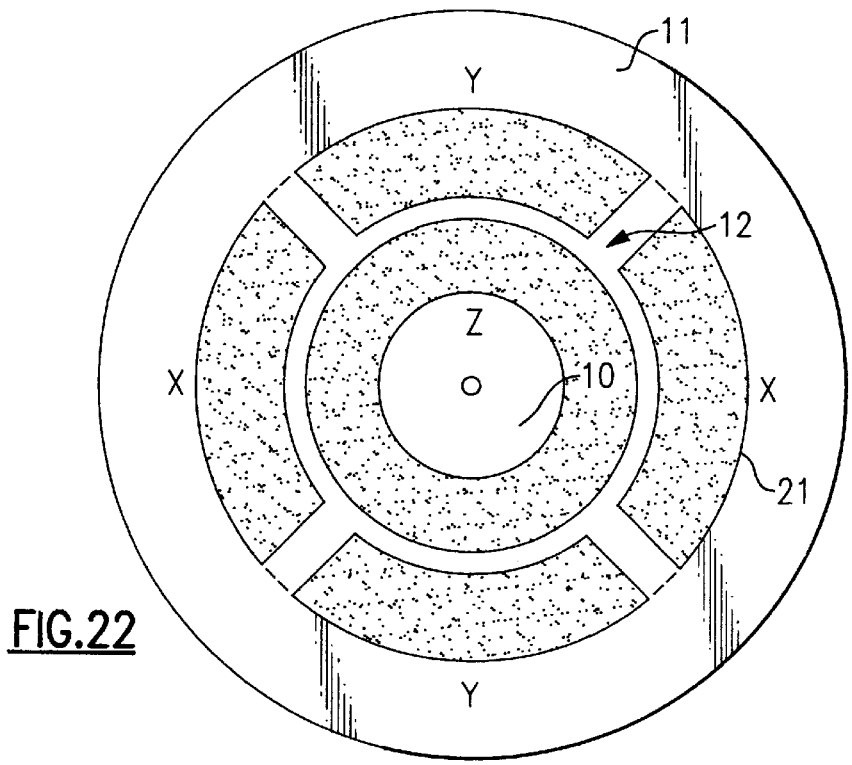
FIG. 22 is a top view illustrating the operation of an embodiment of a three-axis sensor according to the invention.

When a circular-shaped flexible plate is employed, piezoelectric materials 21 may be disposed into the shape of fans or into a pattern generated by dividing a circle into a plurality of parts, as shown in FIGS. 21–23. In the example shown in FIG. 21, two piezoelectric elements are disposed in each of X and Y directions and four piezoelectric elements are disposed for use of detection in the Z direction. In the example shown in FIG. 22, two piezoelectric elements are disposed in each of X and Y directions, and one piezoelectric material is disposed for use of detection in the Z direction. On the other hand, in the example shown in FIG. 23, two piezoelectric elements are disposed in each of X and Y directions and two piezoelectric elements are disposed for use of detection in the Z direction.

Each piece of piezoelectric element is disposed in such a manner that it is located at least between a pair of upper and lower electrodes and it is in contact with the respective electrodes. As described above, the portion of each piezoelectric material located between the upper and lower electrodes acts as a "piezoelectric sensor element". This means that the number of piezoelectric sensor elements may be increased not only by increasing the number of pieces of piezoelectric materials but also by increasing the number of electrodes in contact with the piezoelectric materials.

Figure 26:
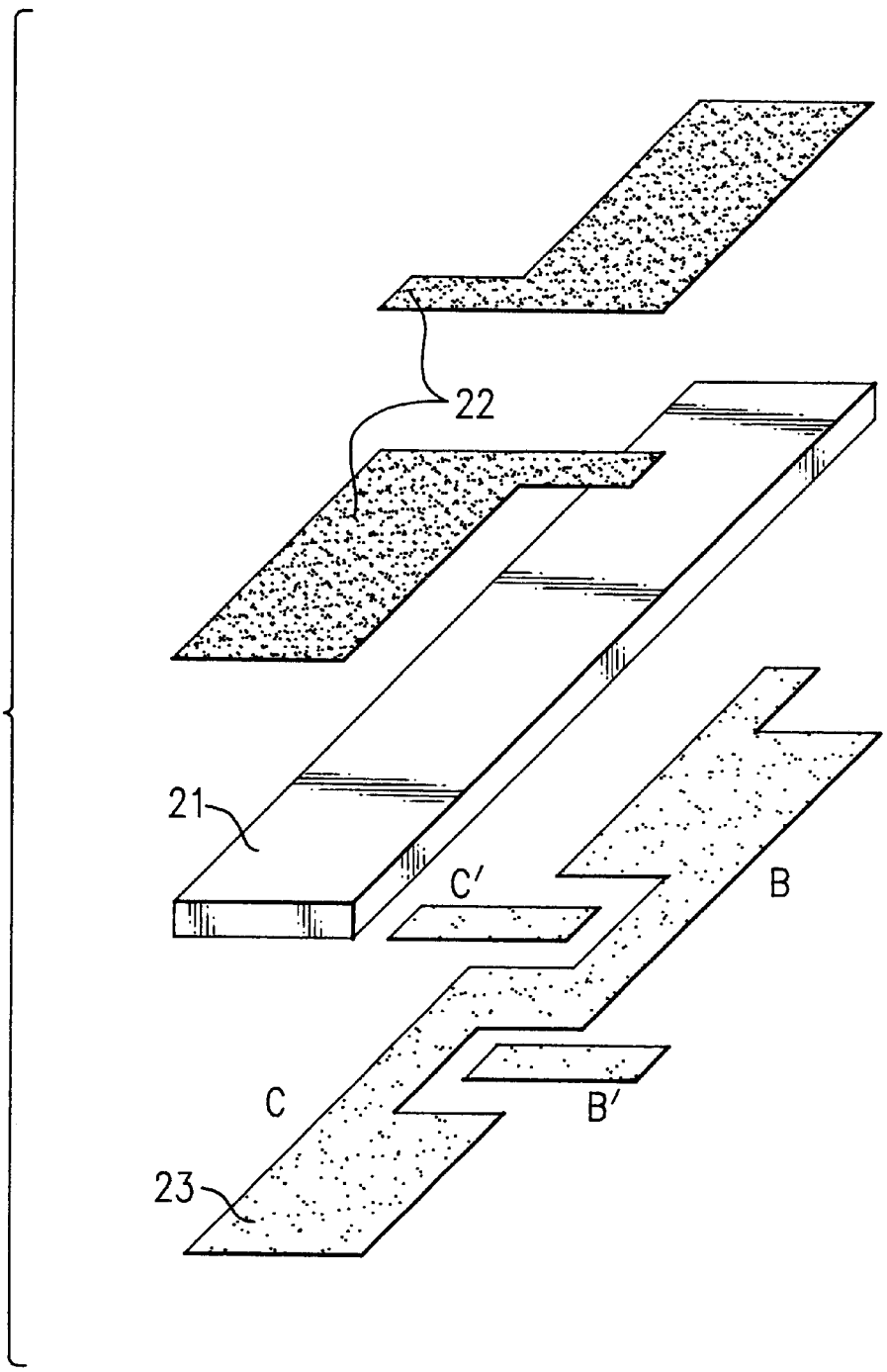
FIG. 26 is a perspective view illustrating an example of the layout of electrodes and piezoelectric materials in a three-axis sensor according to the invention.

For example, two piezoelectric sensor elements may be formed either of two separate pairs of upper electrodes 22 and lower electrodes 23 and two separate pieces of piezoelectric materials 21 as shown in FIG. 24, or of two separate pairs of upper electrodes 22 and lower electrodes 23 and a single piece of piezoelectric material 21 shared by the two piezoelectric sensor elements as shown in FIG. 25. Furthermore, as shown in FIG. 26, a single piece of piezoelectric material 21 and a single lower electrode 23 may be shared by two piezoelectric elements.

A three-axis sensor having any of structures described above is preferably obtained by unitarily firing a supporting base or a supporting column (hereinbelow referred to as supporting base or the like), an operating member, and a flexible plate using a green sheet laminating technique.

A green sheet is obtained by drying a mixed slurry containing a ceramic fine powder, solvent, and the like and characterized in having an excellent flexibility and workability and being able to be cut, bored, and adhered. Therefore, it is possible that a plurality of green sheets cut to have desired sections are laminated, pressed into contact with one another, and then fired to have a predetermined shape. (This is hereinbelow referred to as "green sheet lamination technique".)

The green sheet lamination technique can be employed for a sensor of the present invention, and a supporting base, a weight, and a flexible plate can be unitarily fired. A sensor formed in such a manner has very remarkable effect as shown below.

First, since a green sheet can be easily made thin, and it is excellent in reproducibility of thickness of each sheet and evenness of the total thickness of the sheets, it is easy to make a flexible plate thin and to control thickness of the flexible plate precisely. That is, a sensor formed in an aforementioned manner has a good sensitivity since a flexible plate is bent to a great extent even if a low acceleration is applied. In addition, since variance in flexibility is small among flexible plates or portions in a flexible plate, the sensor is excellent in reproducibility and precision of the direction and the magnitude of an acceleration obtained from a resultant force.

Secondly, since total thickness of green sheets can be adjusted by selecting the number of the sheets, it is easy to balance with a sensitivity in Z axial direction by minutely adjusting a weight of the weight having an influence upon sensitivities in X and Y axial directions by selecting the number of thin plates. That is, a sensitivity in a Z axial direction is well balanced with those in X and Y axial directions in a sensor formed by the aforementioned manner, and less electrical correction by a circuit is required.

Thirdly, since a thin plate cut in a shape of a dislocation is superposed on each of the supporting base, the weight, and the flexible plate, it is possible to select a sheet from sheets having various thicknesses for each member. Therefore, it becomes possible to use sheets properly, for example, a thin sheet having high flexibility for a flexible plate and a thick sheet having high rigidity for a supporting base and a weight. That is, since a sensor formed in the aforementioned manner has high flexibility in the flexible portion and high rigidity in the supporting base and the weight in spite of a unitarily molded body, it has a high sensitivity and high precision.

Besides, since a green sheet lamination technique has a high productivity because it enables to production of many sensors out of one sheet by punching, the technique has an effect that a sensor having high economic efficiency, or the like can be provided. These effects cannot be obtained by another unitary mold.

A small-sized sensor having high sensitivity and high precision can be easily produced by forming the lower electrode, piezoelectric material, and the upper electrode by a thick film method such as a screen printing on a sensor formed using the aforementioned green sheet lamination technique.

It is preferable that the supporting base or the like, the operating member, and the flexible plate are all produced in an integral fashion, and at least one of the supporting base or the like, operating member, and flexible plate has a different chemical composition.

This is because it enables control of properties of each member with making the most of an advantage of unitary molding that productivity can be improved by reducing the number of parts and steps. For example, a sensor having high sensitivity and high precision can be made by employing a chemical composition giving high flexibility to a flexible plate and a chemical composition giving high rigidity to a weight and a supporting base.

Such a method for controlling properties of a flexible plate and the like by a chemical composition is also useful in the case of a unitary mold using a metal and a synthetic resin besides a ceramic material.

Specifically, there can be employed a method in which only a flexible plate is made of ceramic containing 0.1–0.6 wt % of titanium in terms of $TiO_2$ and/or 0.005–0.1 wt % of magnesium in terms of MgO. This is because it is possible to enhance flexibility by mixing titanium and/or magnesium within the aforementioned range(s) in a flexible plate and enhance rigidity of the supporting base or the like and the weight by making their chemical compositions outside the aforementioned ranges.

Figure 37:
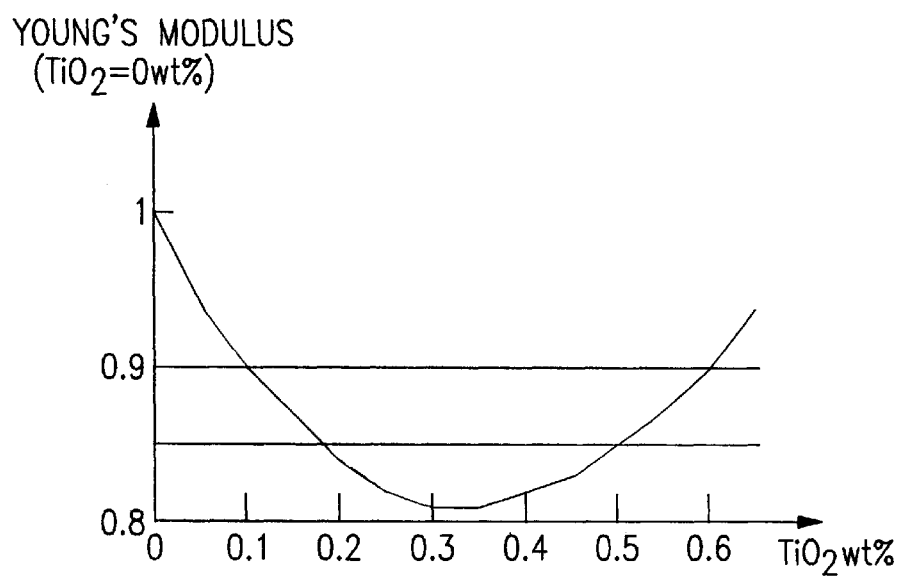
FIG. 37 is a graph showing a correlation between a weight ratio and a Young's modulus of titanium in a flexible plate.
Figure 38:
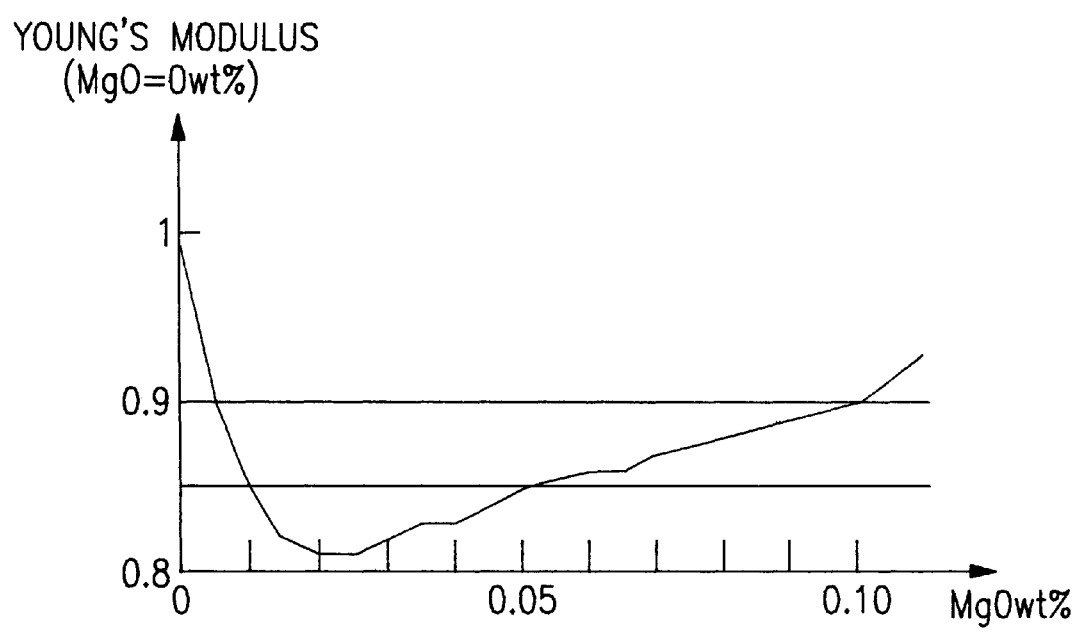
FIG. 38 is a graph showing a correlation between a weight ratio and a Young's modulus of magnesium in a flexible plate.

FIGS. 37 and 38 are graphs showing a correlation between a weight ratio and a Young's modulus of titanium or magnesium in a flexible plate of $ZrO_2$ on the assumption that a Young's modulus of a flexible plate containing neither titanium nor magnesium is 1.

As obvious from the graphs, the flexible plate has the lowest Young's modulus and easily bends when a weight ratio of titanium or magnesium is within the aforementioned range.

Incidentally, when a weight ratio of titanium or magnesium is lower than the aforementioned range, the flexible plate hardly bends, thereby deteriorating a sensitivity of the sensor. When a weight ratio of titanium or magnesium is higher than the aforementioned range, tenacity of the flexible plate deteriorates, and therefore, the flexible plate is prone to breakage, thereby lowering reliability of the sensor.

Therefore, it is more preferable that a flexible plate is made of ceramic containing 0.2–0.5 wt % of titanium in terms of $TiO_2$ and/or 0.01–0.05 wt % of magnesium in terms of MgO. It is preferable that the supporting base or the like and weight have values each of which is lower than the lower limit of the aforementioned range so that tenacity is not deteriorated and that addition or the like of titanium is not necessary.

It is sufficient in the present invention if each member has a different chemical composition from the other as a result. For example, for an element made of a ceramic material, it is possible to obtain a similar effect by a method in which a matter to be a source of a different material (for example, a matter to be titanium source) is applied by a screen printing, a slurry coating, or the like, to a flexible portion of an element being unitarily molded by a one-axis press, a cutting, an injection molding, or the like, or a method for adding the matter to be a titanium source or a magnesium source by a sputtering, a CVD, an ion plating, or the like, besides a green sheet lamination technique using green sheets made of various kinds of materials.

It sometimes happens that a material of each member is not completely divided due to a solid diffusion among members and that a certain inclination in concentration is caused when one of these techniques is employed.

Even so, the obtained one is included in the present invention as long as not every part of sensor has a uniform chemical composition and chemical compositions control properties of each member.

In the present invention, the flexible plate is preferably formed in such a manner as to have a portion mechanically weak compared with the other portion or portions and the "piezoelectric sensor element" is disposed on the weak portion. In this structure, the mechanically weak portion is deformed to a greater degree (because deformation stress is concentrated in the weak portion). Therefore, the "piezoelectric sensor element" disposed on the weak portion can generate a greater voltage between the upper and lower electrodes of the "piezoelectric sensor element" under the same conditions. Thus a higher sensitivity can be achieved.

The sensor according to the invention, therefore, is particularly suitable for use in conjunction with an amplifier having a high input impedance such as a field effect transistor (FET) for amplifying the output of the piezoelectric sensor element.

FIGS. 1(*a*) and 1(*b*) illustrate an example of a sensor constructed in the manner described above.

Figure 1B:
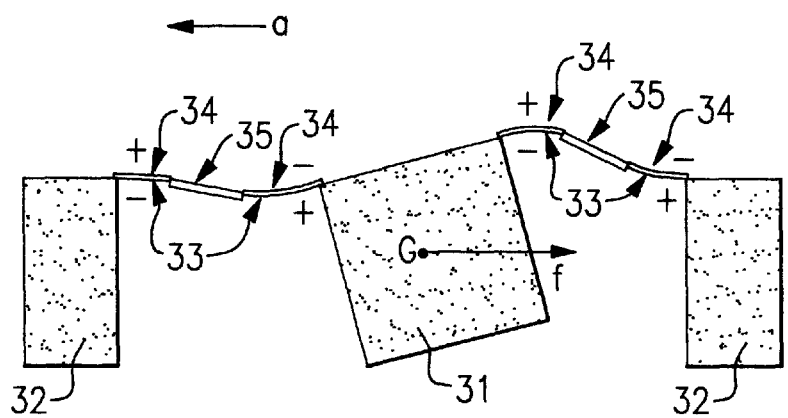
Figure 2:
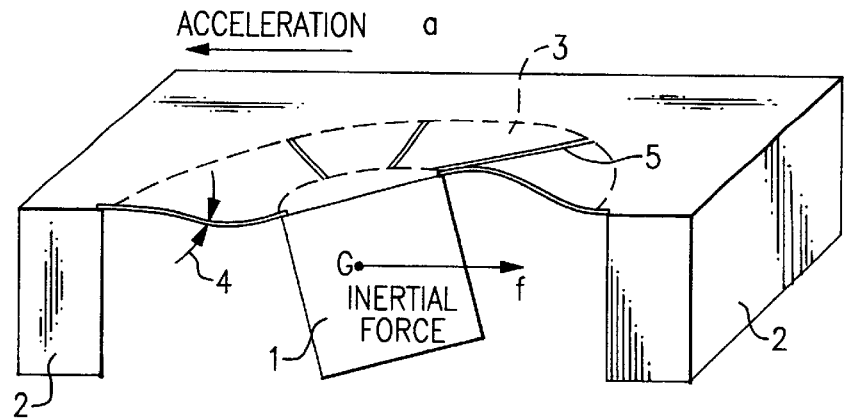
FIG. 2 is a perspective view of an embodiment of a three-axis sensor according to the invention.

In FIGS. 1(a) and 1(b), a flexible plate 30 made up of a thin circular-shaped plate 33 is disposed in such a manner that it horizontally extends between a weight 31 and the supporting base 32. This circular-shaped plate 33 serves as the "relatively weak portion". A mechanically strong portion 35 is then formed between each pair of strip-shaped piezoelectric materials 34 disposed in a radial direction.

When an acceleration a is applied on the sensor according to the invention, it behaves as described below with reference to FIG. 1(b). The behavior of the conventional sensor is also described with reference to FIG. 4(a).

When the external acceleration a is applied on the sensor, the weight experiences an inertial force f in a direction opposite to the acceleration a. As a result, the flexible plate disposed between the weight and the supporting base has a deformation corresponding to the inertial force f.

In the sensor shown in FIG. 1(b), the mechanically strong portions 35 formed in the flexible plate have a deformation to a less degree than the mechanically weak portions. As a result, the deformation-stress which would otherwise be generated in the mechanically strong portions 35 is absorbed into the weak portions.

Figure 4A:
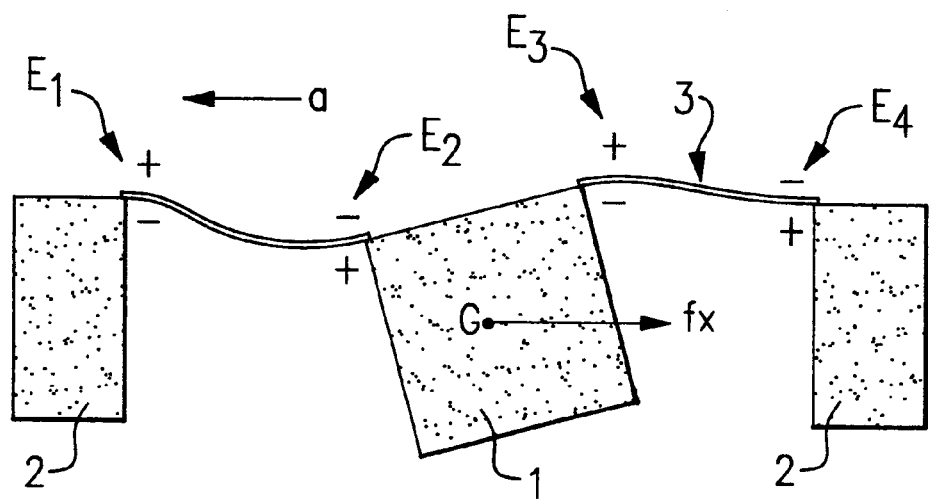
FIGS. 4(a) and 4(b) are a schematic diagram conceptually illustrating the operation of a three-axis sensor according to the invention.

In contrast to the sensor having the structure shown in FIG. 4(a) in which a uniform and continuous deformation occurs over the entire flexible plate 3, the sensor shown in FIG. 1(b) has a deformation which occurs to a particularly great degree in the mechanically weak portions of the flexible plate 30 while a slight or no deformation occurs in the mechanically strong portions 35.

Figure 4B:
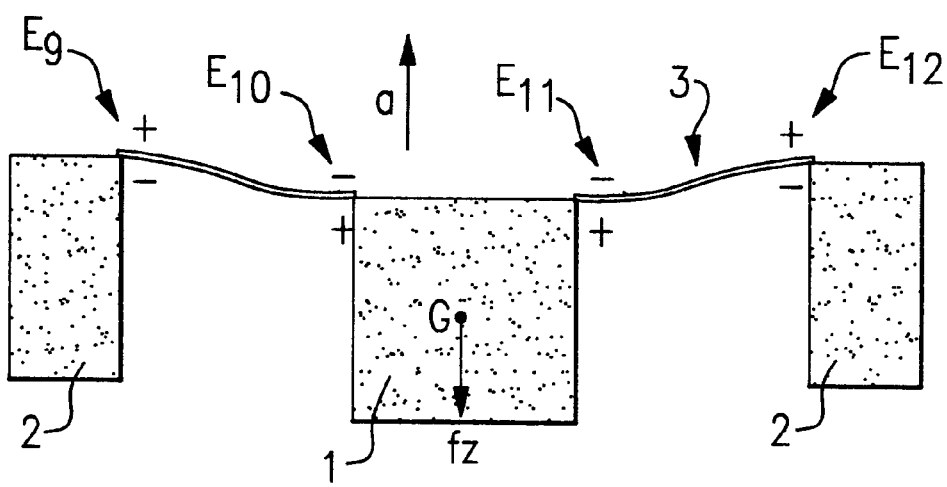
Figure 5A:
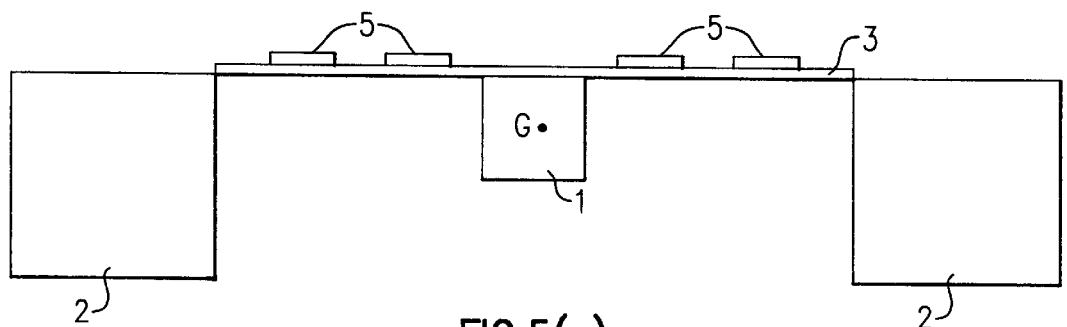
FIGS. 5(a) and 5(b) are a schematic diagram illustrating the operation of a three-axis sensor according to the invention.
Figure 5B:
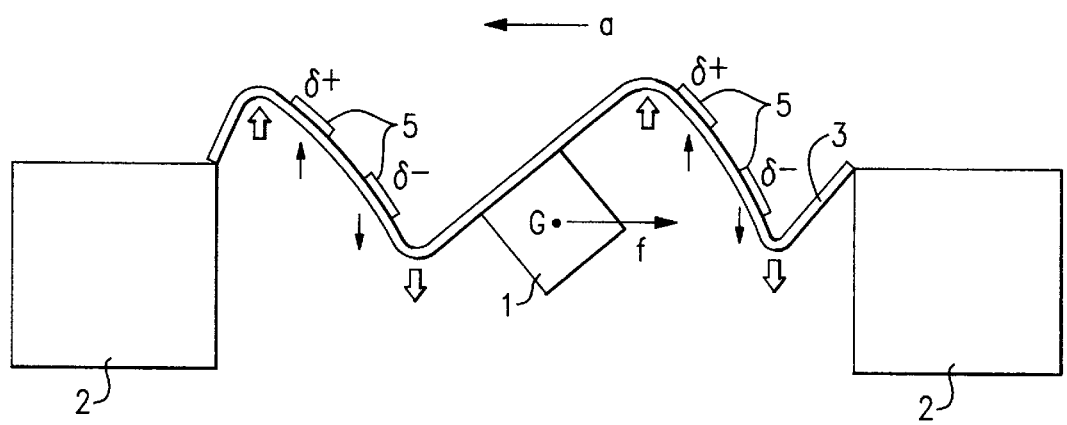

The charges generated in four piezoelectric elements are described in further detail below for both cases of the sensors shown in FIGS. 4(a) and 4(b).

The charge polarity pattern is determined by the deformation pattern generated in the flexible plate and thus there is no difference in the charge polarity pattern between two sensors described above. That is, in both sensors, a deformation pattern of "up-down-up-down" appears in the flexible plate, and a charge polarity pattern of "+−+−" appears on the upper surfaces of the four piezoelectric sensor elements, wherein both deformation and charge polarity patterns are seen from left to right in the figures.

Thus both sensors can correctly detect the direction of the acceleration a on the basis of the charge polarity pattern.

However, the voltage developed between the electrodes as a result of the generation of the charge depends on the magnitude of the deformation of the piezoelectric portions of the flexible plate. Therefore, even if the flexible plate is deformed to an equal degree as a whole in response to an equal acceleration applied, the deformation of the piezoelectric portions is greater in the sensor shown in FIG. 1(b) than in that shown in FIG. 4(a).

Figure 27A:
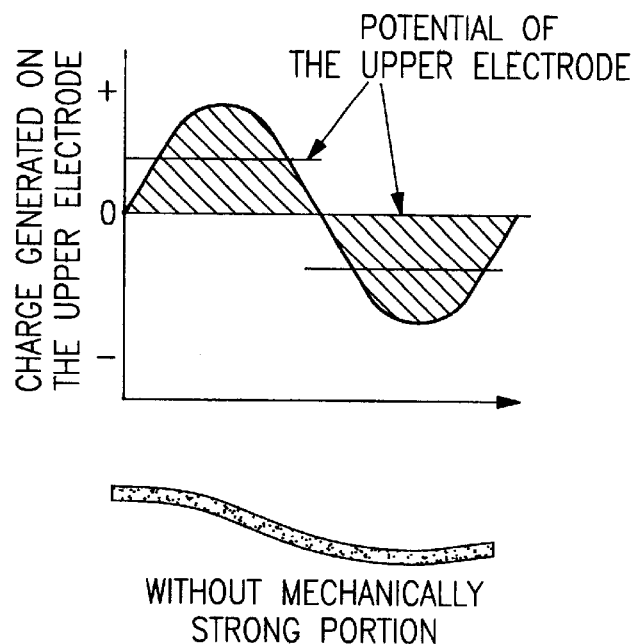
FIGS. 27(a) and 27(b) are a schematic diagram conceptually illustrating the functions of a three-axis sensor according to the invention.
Figure 27B:
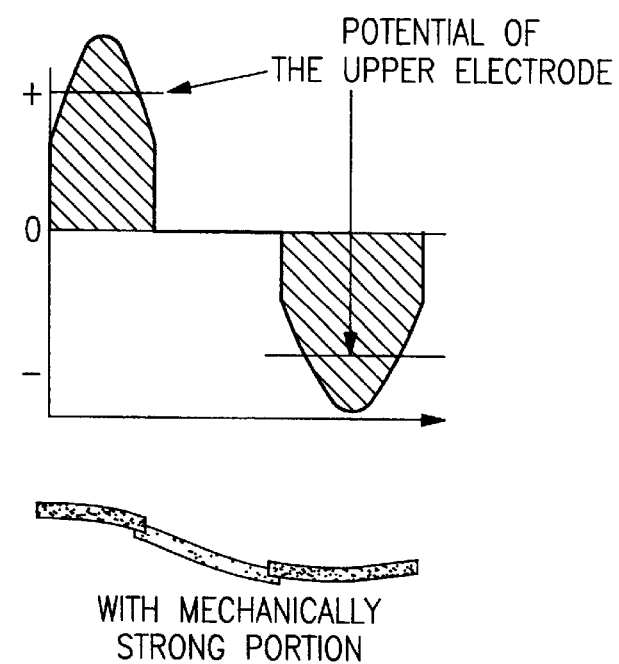

Thus, as shown in FIGS. 27(a) and 27(b), the voltage generated between the electrodes is greater in the sensor shown in FIG. 1(b) than in the sensor shown in FIG. 4(a). That is, the sensor shown in FIG. 1(b) can detect the direction of the acceleration a in the same manner as the sensor shown in FIG. 4(a) and can detect the magnitude with a higher sensitivity. In other words, in order to generate a similar magnitude of voltage in the sensor shown in FIG. 4(a), it is required to increase the mass of the weight.

An easy and preferable way of realizing the mechanically strong portions in the flexible plate is to form relatively thick portions at locations to be enhanced in the mechanical strength.

Figure 28:
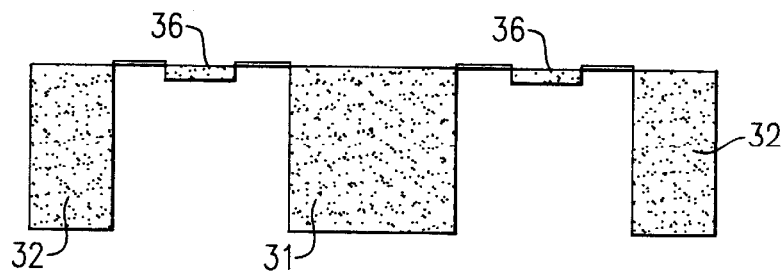
FIG. 28 is a cross-sectional view of an embodiment of a three-axis sensor according to the invention.

For example, the mechanically strong portions may be formed in the flexible plate 30 using a thick plate 36 as shown in FIG. 28.

More specifically, the supporting base, operating member, flexible plate, and thick portions may all be produced in an integral fashion by means of baking using the green sheet lamination technique. Alternatively, thick portions may also be formed by means of the screen printing technique, by means of bonding reinforcing members, or by means of the transfer printing technique.

Still alternatively, mechanically strong portions may also be realized by making desired portions of the flexible plate relatively high in the hardness. This can be accomplished for example by putting a hardening agent on the desired portions of the flexible plate by means of coating or dispersion. As for the hardening agent, an agent which increases hardness as a result of chemical reaction or solid solution with the material of the flexible plate may be employed.

In the case where a piezoelectric material is disposed over the entire upper surface of the flexible plate, it is also possible to make either the flexible plate itself or the piezoelectric material partially hard thereby achieving a similar effect.

SPECIFIC EXAMPLES

All the sensors in Examples were formed by a unitary firing using a green sheet lamination technique. A specific method for producing the sensors is described below.

A zirconia green sheet was cut to obtain sheets having shapes of a weight, a supporting base, and a dislocation, and the sheets were laminated so as to have a shape of a sensor. The sheets were pressed into contact with one another in a direction of the lamination under the conditions of 60–100° C. and 20–40 Kg/cm$^2$ so as to obtain a laminate.

The laminate was unitarily fired at 1400–1500° C. to obtain a fired body. Operation of subjecting the fired body to screen printing and firing was repeated in the order of the lower electrode, the piezoelectric body, and the upper electrode so as to form a piezoelectric element. Thus, a sensor was obtained.

Example 1

In the aforementioned method were employed a zirconia green sheet containing 0.3 wt % of titanium in terms of $TiO_2$ and 0.02 wt % of magnesium in terms of MgO for the flexible portion and an ordinary zirconia green sheet containing neither titanium nor magnesium for the weight and the supporting base. The sheets were unitarily fired by a green sheet lamination technique.

In a sensor constituted in such a manner, the flexible portion is flexible, and the weight and the supporting base are rigid. Therefore, the sensor has high precision and high sensitivity and is preferable.

Examples 2–7 show embodiments of a sensor in which a flexible plate has a portion having high strength.

Example 2

FIGS. 1(a) and 1(b) illustrate an example in which a flexible plate 30 made of a thin circular plate 33 is employed as the mechanically weak portion, and mechanically strong portions 35 are formed between each pair of strip-shaped piezoelectric materials 34 extending in radial directions.

In this sensor, the mechanically strong portions 35 of the flexible plate 30 are deformed to a less extent than the mechanically weak portion 33. In other words, the mechanically weak portion 33 is deformed to a particularly great extent while a slight or no deformation occurs in the mechanically strong portions 35.

As a result, as shown in FIGS. 27(a) and 27(b), the voltage generated between the electrodes is greater than can be obtained by a common sensor. This means that the sensor of the invention has a high sensitivity.

In this specific example, the supporting base 32 and the weight 31 are both formed in a cylindrical shape. This structure is desirable in that the structure is symmetric to a high degree in terms of the detection of the acceleration in the X-Y plane.

Example 3

Figure 29:
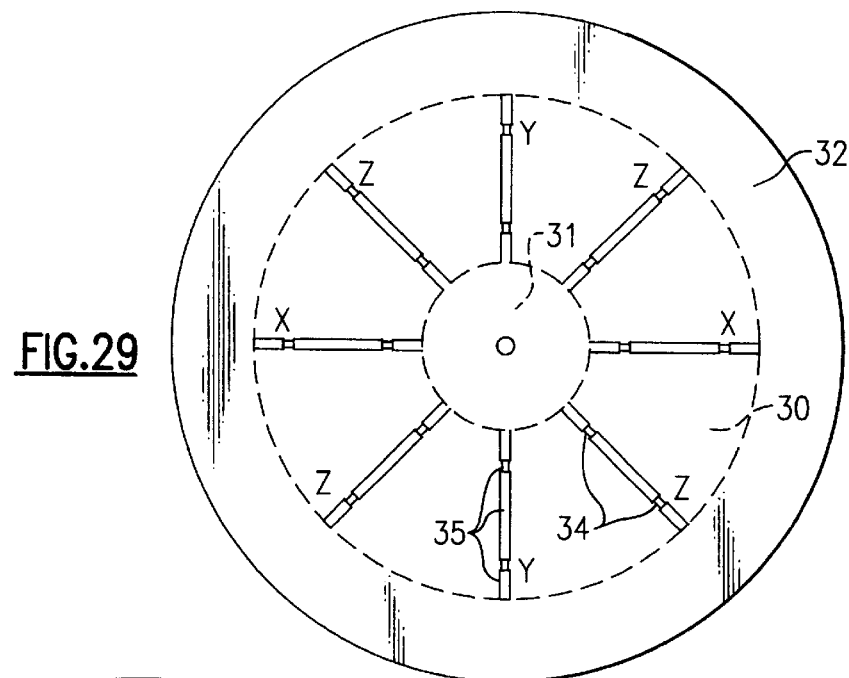
FIG. 29 is a top view of an embodiment of a three-axis sensor according to the invention.

FIG. 29 illustrates an example in which the basic structure shown in FIG. 1 is modified such that the piezoelectric materials 34 are reduced into smaller portions and the remaining portions are converted into mechanically strong portions 35.

In this structure, the mechanically strong portions 35 have a greater total area which brings about an advantage that a greater stress is generated in the piezoelectric materials 34.

Example 4

Figure 30:
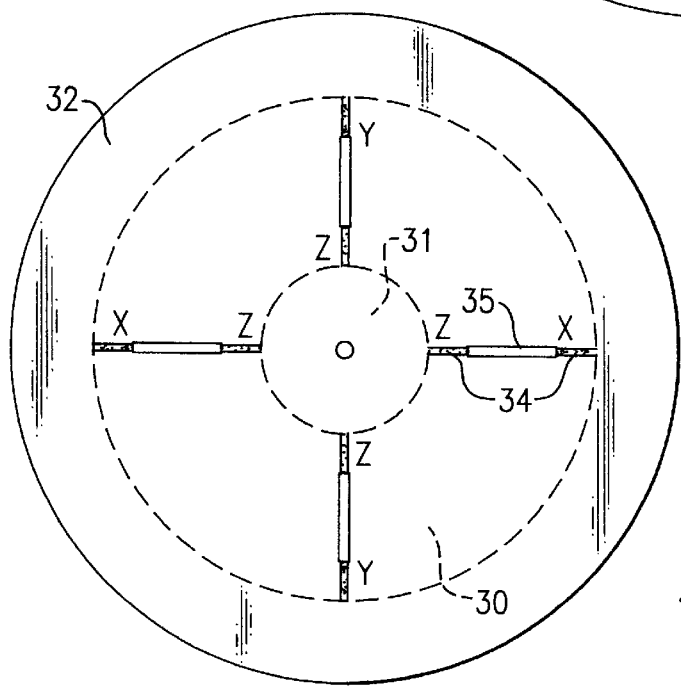
FIG. 30 is a top view of an embodiment of a three-axis sensor according to the invention.

FIG. 30 illustrates another example in which the basic structure employed in Example 1 is modified such that the number of piezoelectric elements disposed in the X and Y directions are each reduced to two, and the number of those for use in detection in the Z direction is reduced to four. Thus, the total number of piezoelectric elements is reduced to eight.

This simpler structure makes it possible to easily make electric connections. Furthermore, adjustment becomes easier.

Example 5

Figure 31A:
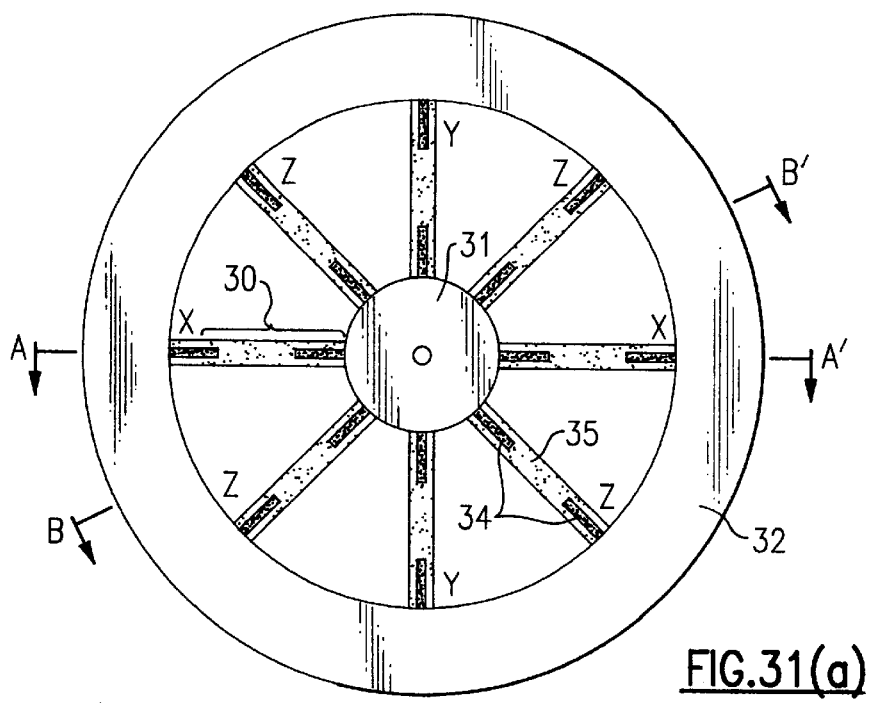
FIGS. 31(a), 31(b) and 31(c) are a schematic diagram of an embodiment of a three-axis sensor according to the invention, wherein a top view is given in FIG. 31(a), and a cross-sectional view taken along A–A' line and that taken along B–B' line are given in FIGS. 31b and 31c, respectively.
Figure 31B:
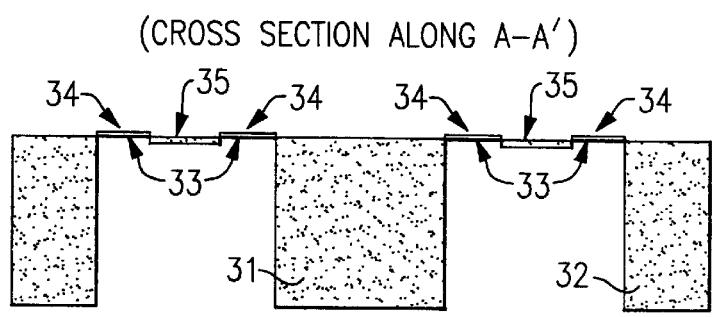
Figure 31C:
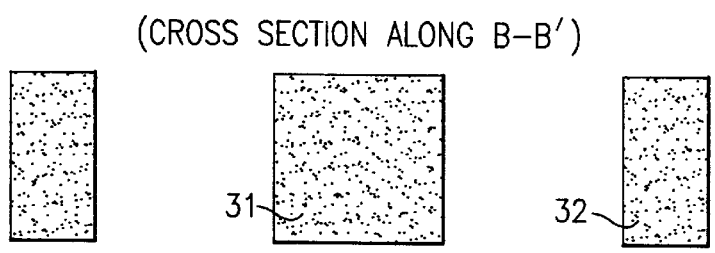

In another example shown in FIGS. 31(a), 31(b) and 31(c), the flexible plate 30 employed in Example 1 are replaced by a plurality of long plate-shaped flexible plates extending between the weight 31 and the supporting base 32. A mechanically strong portion 35 is formed in the center of each long plate-shaped flexible plate.

The employment of the long-shaped flexible plates brings about an advantage that the flexible plates can be deformed more easily and thus a stress is generated more easily in the piezoelectric materials.

Example 6

Figure 32:
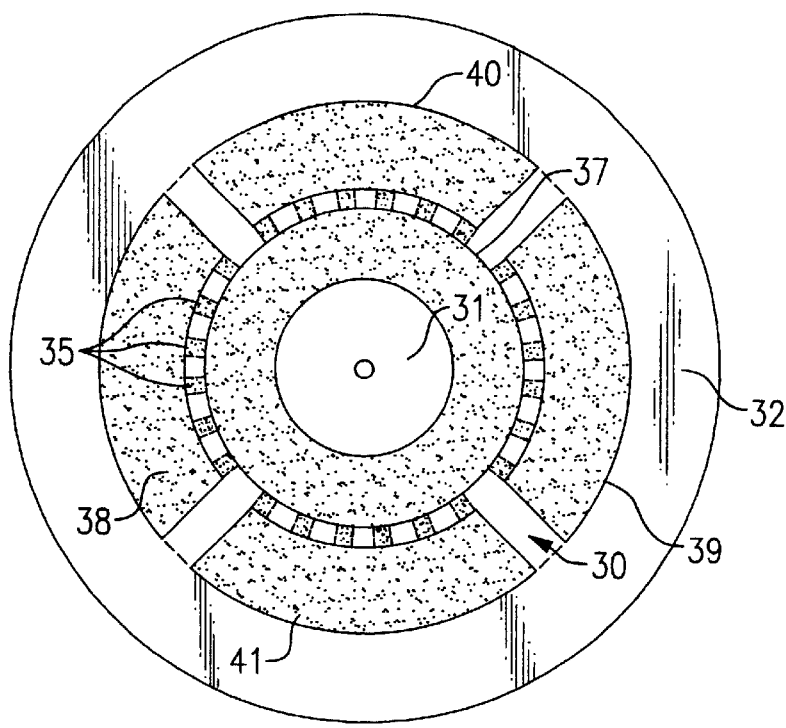
FIG. 32 is a top view of an embodiment of a three-axis sensor according to the invention.

FIG. 32 illustrates an example in which fan-shaped piezoelectric materials are employed.

There are provided mechanically strong portions 35 spaced from each other between the Z-direction piezoelectric material 37 located at the center and the X-direction piezoelectric materials 38, 39 and the Y-direction piezoelectric materials 40, 41 at peripheral locations. If the mechanically strong portion is formed in a continuous fashion, then the flexible plate is prevented from being deformed in a desired fashion. This problem can be avoided in this example in which the mechanically strong portions are formed into a plurality of separate pieces.

Example 7

Figure 33:
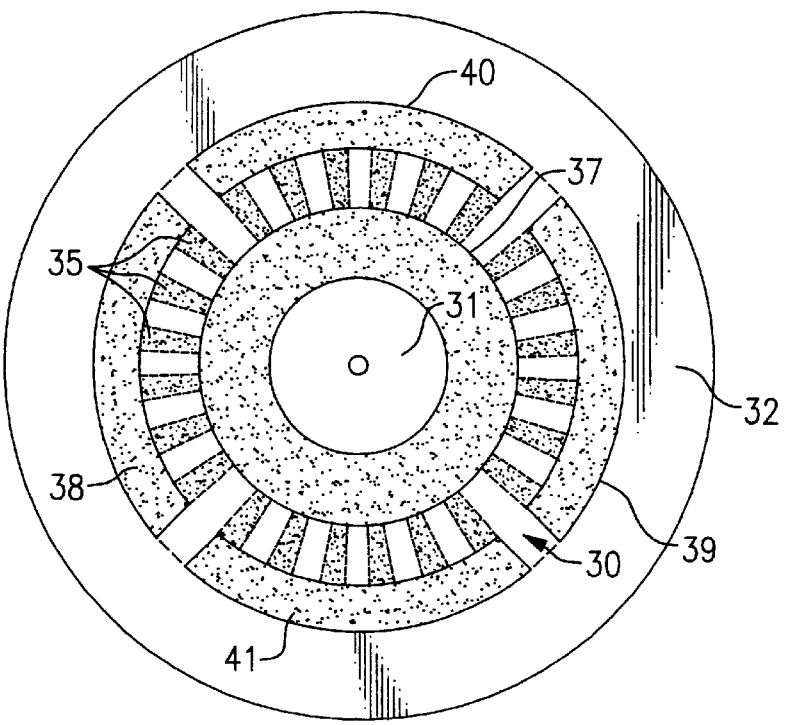
FIG. 33 is a top view of an embodiment of a three-axis sensor according to the invention.
Figure 34:
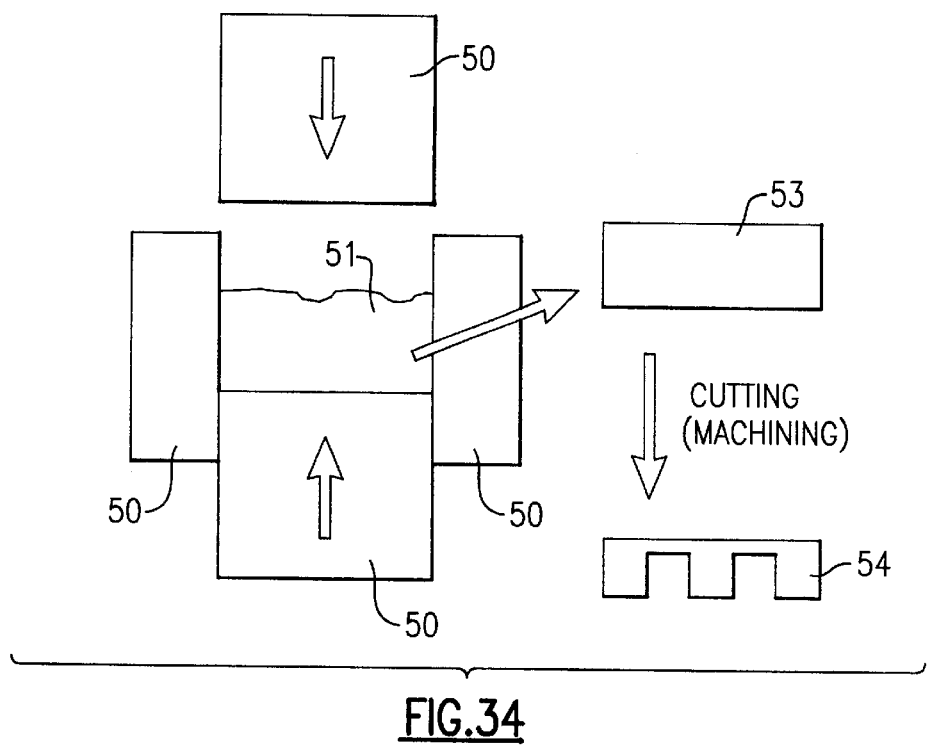
FIG. 34 is a schematic explanatory view showing a mode of carrying out a conventional unitary mold.
Figure 35:
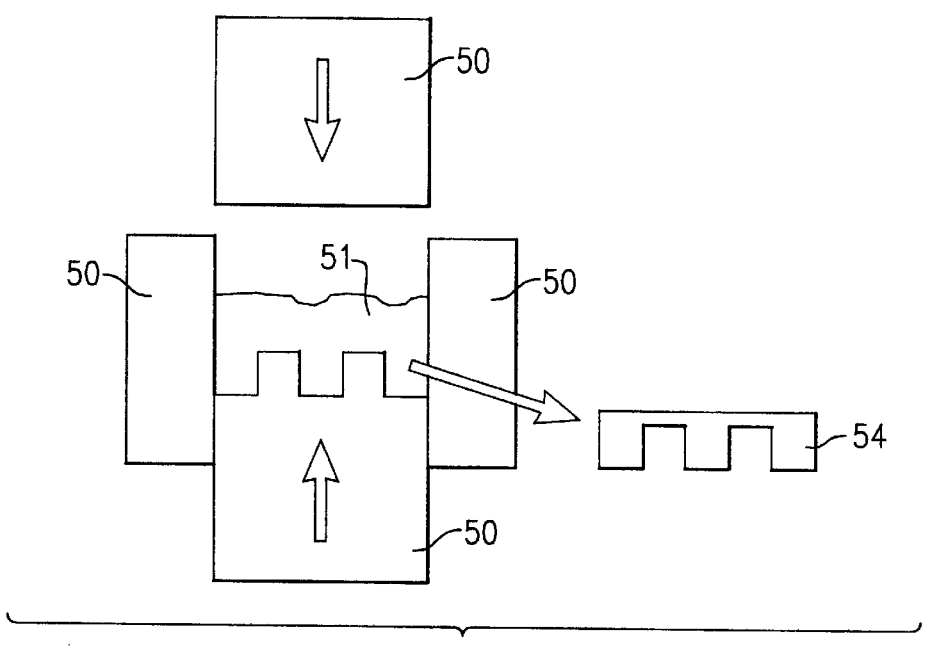
FIG. 35 is a schematic explanatory view showing a mode of carrying out a conventional unitary mold.
Figure 36:
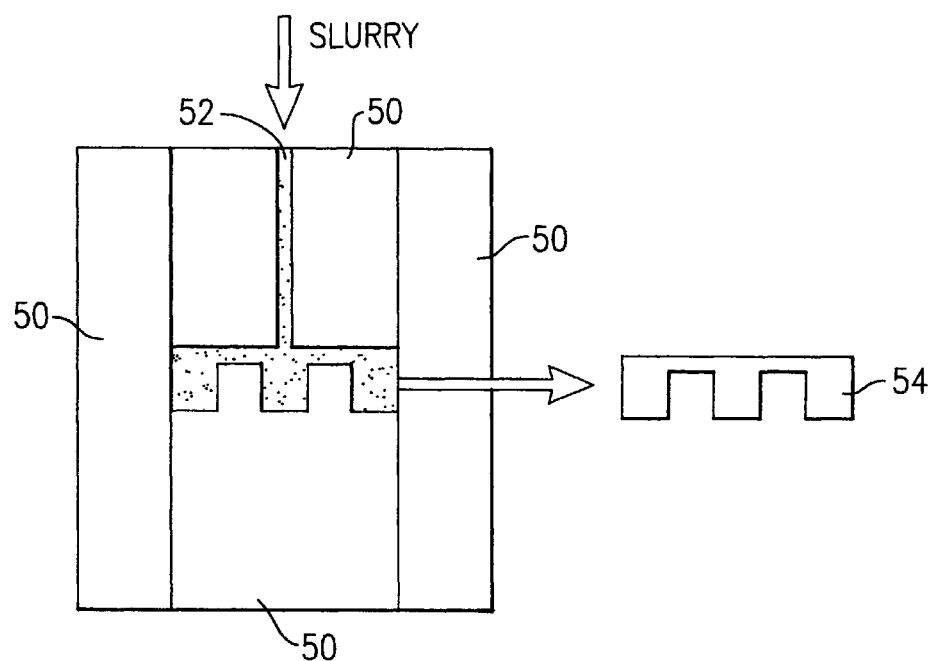
FIG. 36 is a schematic explanatory view showing a mode of carrying out a conventional unitary mold.

In another example shown in FIG. 33, the mechanically strong portions 35 of Example 6 are replaced by longer portions.

The increase in the area of the mechanically strong portions makes it possible to more easily induce a stress in the piezoelectric materials.

As described above, in the three-axis sensor according to the present invention, deformation stress in the flexible plate is concentrated into the portions where the piezoelectric materials are disposed. This makes it possible to realize a sensor having a high sensitivity without causing an increase in the size of the operating member and thus the total size of the sensor.

The sensor according to the invention, therefore, is particularly suitable for use in conjunction with an amplifier having a high input impedance such as a field effect transistor (FET) for amplifying the output of the piezoelectric sensor element.

What is claimed is:

1. A three-axis sensor comprising:

a supporting base having a cavity formed therein;

an operating member disposed substantially at a radial center of the cavity; and at least one flexible plate having at least one piece of piezoelectric material in contact with at least one pair of electrodes and extending across said cavity at an end of said supporting base, said operating member being suspended at said center of said cavity by said at least one flexible plate;

said at least one flexible plate being deformed in response to behavior of said operating member corresponding to a physical quantity applied to said sensor, said piece of piezoelectric material generating a charge corresponding to the deformation of the at least one flexible plate thereby three-dimensionally detecting magnitude and direction of said physical quantity;

said at least one flexible plate having at least a first portion which is mechanically weaker than at least a second portion of said flexible plate, said piece of piezoelectric material being positioned in said first portion of said flexible plate which is mechanically weaker than said second portion of said flexible plate, whereby deformation of said flexible plate is more concentrated on said first portion where said piece of piezoelectric material is positioned.

2. A three-axis sensor comprising:

a supporting column;

at least one flexible plate having at least one piece of piezoelectric material in contact with at least one pair of electrodes and extending outward in a horizontal direction from said supporting column, said supporting column located at a center of said at least one flexible plate; and an operating member suspended at an end of said at least one flexible plate;

said at least one flexible plate being deformed in response to behavior of said operating member corresponding to a physical quantity applied to said sensor, said piece of piezoelectric material generating a charge corresponding to the deformation of the at least one flexible plate thereby three-dimensionally detecting magnitude and direction of said physical quantity;

said at least one flexible plate having at least a first portion which is mechanically weaker than at least a second portion of said flexible plate, said piece of piezoelectric material being positioned in said first portion of said flexible plate which is mechanically weaker than said second portion of said flexible plate, whereby deformation of said flexible plate is more concentrated on said first portion where said piece of piezoelectric material is positioned.

3. A three-axis sensor according to claim 1, wherein a weight is employed as the operating member for detecting an acceleration applied to said sensor.

4. A three-axis sensor according to claim 2, wherein a weight is employed as the operating member for detecting an acceleration applied to said sensor.

5. A three-axis sensor according to claim 1, wherein the supporting base, operating member, and at least one flexible plate are all produced in an integral fashion by means of firing using a green sheet lamination technique.

6. A three-axis sensor according to claim 2, wherein the supporting column, operating member, and at least one flexible plate are all produced in an integral fashion by means of firing using a green sheet lamination technique.

7. A three-axis sensor according to claim 1, wherein the supporting base, the operating member, and the at least one flexible plate are all produced in an integral fashion, and at least one of the supporting base or the supporting column, operating member, and at least one flexible plate has a different chemical composition.

8. A three-axis sensor according to claim 2, wherein the supporting column, the operating member, and the at least one flexible plate are all produced in an integral fashion, and at least one of the supporting base or the supporting column, operating member, and at least one flexible plate has a different chemical composition.

9. A three-axis sensor according to claim 1, wherein only the at least one flexible plate is made of ceramic containing 0.1–0.6 wt % of titanium in terms of $TiO_2$ and/or 0.005–0.1 wt % of magnesium in terms of MgO.

10. A three-axis sensor according to claim 2, wherein only the at least one flexible plate is made of ceramic containing 0.1–0.6 wt % of titanium in terms of $TiO_2$ and/or 0.005–0.1 wt % of magnesium in terms of MgO.

11. A three-axis sensor according to claim 1, wherein only the at least one flexible plate is made of ceramic containing 0.2–0.5 wt % of titanium in terms of $TiO_2$ and/or 0.01–0.05 wt % of magnesium in terms of MgO.

12. A three-axis sensor according to claim 2, wherein only the at least one flexible plate is made of ceramic containing 0.2–0.5 wt % of titanium in terms of $TiO_2$ and/or 0.01–0.05 wt % of magnesium in terms of MgO.

13. A three-axis sensor according to claim 1, wherein said first portion of said at least one flexible plate is less thick than said second portion so that said first portion is weaker in mechanical strength than said second portion.

14. A three-axis sensor according to claim 2, wherein said first portion of said at least one flexible plate is less thick than said second portion so that said first portion is weaker in mechanical strength than said second portion.

15. A three-axis sensor according to claim 1, wherein the supporting base, operating member, at least one flexible plate, and a thick portion are all produced in an integral fashion by means of baking using a green sheet lamination technique, in such a manner that said second portion of said at least one flexible plate is thick compared to said first portion.

16. A three-axis sensor according to claim 1, wherein the second portion is made thicker than said first portion by means of a screen printing technique, attachment of a reinforcing member, or a transfer printing technique.

17. A three-axis sensor according to claim 2, wherein the second portion is made thicker than said first portion by means of a screen printing technique, attachment of a reinforcing member, or a transfer printing technique.

18. A three-axis sensor according to claim 1, wherein said second portion of said at least one flexible plate is harder than said first portion, so that said first portion is weaker in mechanical strength than said second portion.

19. A three-axis sensor according to claim 2, wherein said second portion of said at least one flexible plate is harder than said first portion, so that said first portion is weaker in mechanical strength than said second portion.

20. A three-axis sensor according to claim 1, wherein a hardening agent is disposed by means of a coating or spraying technique so that said second portion of said at least one flexible plate is made harder than said first portion.

21. A three-axis sensor according to claim 2, wherein a hardening agent is disposed by means of a coating or spraying technique so that said second portion of said at least one flexible plate is made harder than said first portion.

* * * * *